US008655415B2

(12) United States Patent
Yokota

(10) Patent No.: US 8,655,415 B2
(45) Date of Patent: Feb. 18, 2014

(54) MOBILE TERMINAL AND SLIDE CONTROLLING PROGRAM

(75) Inventor: Nozomi Yokota, Daito (JP)

(73) Assignee: KYOCERA Corporation, Kyoto (JP)

( * ) Notice: Subject to any disclaimer, the term of this patent is extended or adjusted under 35 U.S.C. 154(b) by 198 days.

(21) Appl. No.: 13/322,370

(22) PCT Filed: May 24, 2010

(86) PCT No.: PCT/JP2010/058713
§ 371 (c)(1),
(2), (4) Date: Nov. 23, 2011

(87) PCT Pub. No.: WO2010/137545
PCT Pub. Date: Dec. 2, 2010

(65) Prior Publication Data
US 2012/0071211 A1 Mar. 22, 2012

(30) Foreign Application Priority Data

May 26, 2009 (JP) .................................. 2009-126608

(51) Int. Cl.
*H04M 1/00* (2006.01)
*H04B 1/38* (2006.01)
(52) U.S. Cl.
USPC .................. 455/566; 455/90.3; 455/575.4
(58) Field of Classification Search
USPC ................. 455/90.3, 566, 575.1, 575.4; 379/433.01, 433.11, 433.12, 434
See application file for complete search history.

(56) References Cited

U.S. PATENT DOCUMENTS

| 6,892,082 | B2 * | 5/2005 | Boesen ...................... 455/90.3 |
| 6,944,481 | B2 * | 9/2005 | Hama et al. .................. 455/566 |
| 8,174,628 | B2 * | 5/2012 | Matsushita et al. ........... 348/836 |
| 8,326,368 | B2 * | 12/2012 | Sawada et al. ................ 455/566 |
| 2005/0083642 | A1 | 4/2005 | Senpuku et al. |

(Continued)

FOREIGN PATENT DOCUMENTS

| JP | 2005-026818 A | 1/2005 |
| JP | 2005-215453 A | 8/2005 |

(Continued)

OTHER PUBLICATIONS

International Search Report dated Jun. 29, 2010, issued by the Japanese Patent Office for International Application No. PCT/JP2010/058713.

(Continued)

*Primary Examiner* — Quochien B Vuong
(74) *Attorney, Agent, or Firm* — Procopio, Cory, Hargreaves & Savitch LLP

(57) ABSTRACT

A mobile terminal 10 includes a first case C1 and a second case C2. Furthermore, the mobile terminal 10 is a slidable mobile terminal in which the first case C1 is slidably coupled to the second case C2 so as to be stacked thereon. On a top surface of the first case C1, a first display 26 is provided. Also, on a top surface of the second case C2, a second display 34 is provided in such a position so as not to be exposed in a home position (closed position) and so as to be exposed when a sliding operation is performed. For example, when a switch to a sliding position is made by a user during an incoming call, a name of a communication partner is displayed on the second display 34.

20 Claims, 17 Drawing Sheets

(56) References Cited

U.S. PATENT DOCUMENTS

| | | |
|---|---|---|
| 2007/0285401 A1 | 12/2007 | Ohki et al. |
| 2008/0051161 A1 | 2/2008 | Tashiro |
| 2009/0057007 A1 | 3/2009 | Miyaoka |
| 2009/0061963 A1 | 3/2009 | Miyaoka |

FOREIGN PATENT DOCUMENTS

| | | |
|---|---|---|
| JP | 2004-164216 A | 6/2006 |
| JP | 2006-279495 A | 10/2006 |
| JP | 2008-033595 A | 2/2008 |
| JP | 2008-061185 A | 3/2008 |
| JP | 2008-301244 A | 12/2008 |
| JP | 2009-059102 A | 3/2009 |
| JP | 2009-060292 A | 3/2009 |
| JP | 2009-111879 A | 5/2009 |
| WO | 2006/051669 A1 | 5/2006 |

OTHER PUBLICATIONS

Basic Manual for W61SA by Sanyo, CDMA 1X WIN, AU by Kddi, Feb. 2008 Edition.

* cited by examiner ial display (sub display) is also provided to the slidable mobile phones, but it follows the next disadvantage. First, in the slidable mobile terminal of this document, a step occurs in the compact state, so that this hinders the user from carrying the mobile phone. Second, the large-sized liquid crystal display and the small-sized liquid crystal display are provided on the lower housing, and thus, when sliding from the compact state to the extended state is made, useability in sliding is made lower than that of the slidable mobile phones as in the non-patent document 1, etc. Moreover, in the compact state, the main display is hidden,

MOBILE TERMINAL AND SLIDE CONTROLLING PROGRAM

TECHNICAL FIELD

The present invention relates to mobile terminals. More specifically, the present invention relates to a mobile terminal having a plurality of housings that are slidably coupled to each other.

BACKGROUND ART

Conventionally, mobile terminals having a plurality of housings that are slidably coupled to each other have widely been known, and one example of the apparatuses of such a kind is disclosed in a non-patent document 1. The slidable mobile phone of the background art is provided with a display which is exposed from an upper housing, and the power of the display is turned off in a standby state. Then, when a user confirms a time display and a remaining amount of a battery, and receives an incoming call and an incoming mail, the power of the display and the backlight of the display are turned on, to thereby display predetermined information on the display.

Furthermore, in a patent document 1, a slidable mobile terminal is disclosed. The mobile terminal has a large-sized liquid crystal display and a small-sized liquid crystal display on a lower housing. Furthermore, in a compact state (closed position), the large-sized liquid crystal display is provided in such a position so as to be overlapped with the other housing, and thus, only the small-sized liquid crystal display is exposed.

[Non-patent document 1] Manual for W61SA by SANYO, Page 22

[Patent document 1] Japanese Patent Application Laying-Open No. 2008-61185 [H04M 1/02, H04B 1/38]

SUMMARY OF THE INVENTION

Problems to be Solved by the Invention

Recently, in mobile terminals such as mobile phones, etc., in order to extend battery life of a rechargeable battery, techniques of reducing power consumption have been developed. However, with respect to the mobile phone of the non-patent document 1, merely performing a simple operation of confirming a time turns on the power of the display and the backlight, resulting in higher power consumption than that of foldable mobile phones having a sub display.

Furthermore, the large size of the displays have progressed in the market of the mobile phones, but the slidable mobile phones suffer from the disadvantage that a third party may peep at the display when a time and a remaining amount of the battery are confirmed, and when an incoming call and an incoming mail are received.

Hereupon, as in the patent document 1, it is conceivable that a small-sized liquid crystal display (sub display) is also and this substantially hinders "use in the closed state" being an advantage of the slidable mobile phones.

Therefore, it is a primary object of the present invention to provide a novel mobile terminal.

Another object of the present invention is to provide a mobile terminal capable of reducing power consumption.

A still another object of the present invention is to provide a mobile terminal capable of protecting privacy.

A further another object of the present invention is to provide a mobile terminal and a slide controlling program capable of surely providing information required by a user.

Means for Solving the Problems

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is a mobile terminal comprising a first housing; a first display which is provided on the first housing; at least one second housing which is slidably coupled with the first housing; and a second display which is provided in such a position so as not to be exposed in a home position, and so as to be exposed when a sliding operation is performed.

In the first invention, the first housing (C1) and the second housing (C2) are configured in the form of plate. Furthermore, the first housing is provided with a first display (26), such as an LCD monitor, etc. The first housing and the second housing are slidably coupled to each other by means of a sliding mechanism (50) including a spring (56). Then, the second display (34) for which an organic light emitting panel, etc. is employed is provided in such a position so as not to be exposed in a home position (closed position), and so as to be exposed when a sliding operation is performed.

According to the first invention, by performing a sliding operation as a simple operation, a user can confirm predetermined information, such as a time, etc. on the second display. Then, by using the second display lower in power consumption than the first display, it is possible to reduce power consumption of the mobile terminal.

Furthermore, in the home position, the first display is placed in a display state that takes the privacy into consideration. Thus, the predetermined information is displayed only when a sliding operation is performed, to thereby protect user's privacy. In addition, the second display smaller in size than the first display is used to thereby enhance the effect of privacy protection.

A second invention is according to the first invention, wherein the first housing is coupled with the second housing so as to be stacked thereon, and the second display is provided on the second housing.

In the second invention, the first housing is stacked on the second housing as in the slidable mobile terminals, for example. The second display is provided to the second housing so as to be sandwiched between the first housing and the second housing, for example.

According to the second invention, the first display and the second display are provided in such positions so as to be confirmed simultaneously when a sliding operation is performed, capable of improving user convenience.

A third invention is according to the first invention or the second invention, further comprising: a determiner which determines whether a specific state or not; a detector which detects the sliding operation; and an information displayer which displays information on the second display when the specific state is determined, and the sliding operation is detected.

In the third invention, a determiner (20, S1, S27, S45, S49) determines a state of high frequency of use as a specific state (incoming call state, incoming mail state, standby state) when the mobile terminal is in use. A detector (20, 40, 42, S41) detects a sliding operation from a value output from a magnetic sensor, for example. An information displayer (20, S71, S111, S155, S183) displays information to be notified to a user on the second display corresponding to the specific state.

According to the third invention, it becomes possible to precisely provide information required by the user depending on the situations in which the mobile terminal is in use.

A fourth invention is according to the third invention, further comprising: an open position detector which detects whether or not the first housing and the second housing are in the open position; and a first processor which executes predetermined processing when the information is displayed by the information displayer, and the open position is detected.

In the fourth invention, an open position detector (20, 42, 44) detects the open position by using a magnetic sensor and a magnet, for example. The first processor (20, S79, S119, S159) executes processing to be executed at a high possibility in the specific state as predetermined processing.

According to the fourth invention, the user continuously performs a sliding operation after confirming the information displayed on the second display to thereby execute the predetermined processing.

A fifth invention is according to the fourth invention, wherein the specific state includes an incoming call state, the determiner includes an incoming call determiner which determines whether the incoming call state or not, and the first processor includes a speech communication processor which starts speech communication processing when the incoming call state is determined.

In the fifth invention, an incoming call determiner (20, S1, S45) determines whether an incoming call state included in the specific state or not. A speech communication processor (20, S79) establishes a speech communication allowable state with a communication partner when a switch to the open position is made.

According to the fifth invention, the user can start a speech communication with the communication partner after confirming the information of the communication partner.

A sixth invention is according to the fourth invention, wherein the specific state includes an incoming mail state of a mail message, and the determiner further includes an incoming mail determiner which determines whether the incoming mail state or not, and the first processor includes a mail displayer which displays a content of the mail message on the first display when the incoming mail state is determined.

In the sixth invention, an incoming mail determiner (20, S27, S49) determines whether or not an incoming mail state included in the specific state. A mail displayer (20, S119) displays a content (text) of a mail message on the first display when a switch to the open position is made.

According to the sixth invention, the user can display the text of the mail message after confirming the sender, and etc. of the mail message.

A seventh invention is according to the first invention, further comprising: a touch operation detector which detects, in a touch responsive area provided on the second display, a touch operation within the touch responsive area; an acquirer which acquires information of processing to be executed; a design displayer which displays a design on the second display on the basis of the information of the processing acquired by the acquirer; and a second processor which executes predetermined processing when a touch operation is included within the display area of the design.

In the seventh invention, a touch operation detector (20, 38) includes a touch panel (38) provided on the top surface of the second display, for example. Also, the touch operation detector detects a touch operation in the touch responsive area corresponding to the display area of the second display. An acquirer (20, S211) acquires a function ID of the processing (music player function) to be executed, for example. A design displayer (20, S215) displays a design representing touch keys on the second display on the basis of the acquired function ID, for example. The second processor (20, S221) executes predetermined processing different from that by the first processor in response to the touch operation included within the display area of the design, that is, the operation of the touch key.

According to the seventh invention, it is possible to display the touch keys corresponding to various functions to be executed in the mobile terminal on the second display. This makes it possible for developers of the mobile terminals to effectively use the position where the second display is provided in the mobile terminals which suffer from a limitation in the number of operation keys to be arranged. Furthermore, depending on the function to be executed, the touch keys are displayed, and this makes it easy for the user to perform an input operation with respect to the function to be executed.

An eighth invention causing a processor (20) of a mobile terminal (10) according to claim 1 to function as: a determiner (S1, S25, S43, S47) which determines whether a specific state (incoming call state, incoming mail state, standby state) or not; a detector (S41) which detects a sliding operation; and an information displayer (S71, S111, S153) which displays information on the second display when the specific state is determined, and the sliding operation is detected.

In the eighth invention also, similar to the third invention, it is possible to precisely provide the information required by the user depending on the situations in which the mobile terminal is in use.

According to the present invention, when a simple operation is performed, the predetermined information is displayed on the display being lower in power consumption, whereby, it is possible to reduce the power consumption of the mobile terminal.

Furthermore, in the home position, one display is placed in a display state that takes privacy into consideration, and on the other display to be exposed in response to a simple operation, the predetermined information is displayed, whereby it is possible to protect user's privacy.

In addition, it becomes possible to precisely provide the information required by the user depending on the situations in which the mobile terminal is in use.

The above described objects and other objects, features, aspects and advantages of the present invention will become more apparent from the following detailed description of the present invention when taken in conjunction with the accompanying drawings.

FORMS FOR EMBODYING THE INVENTION

Figure 1:
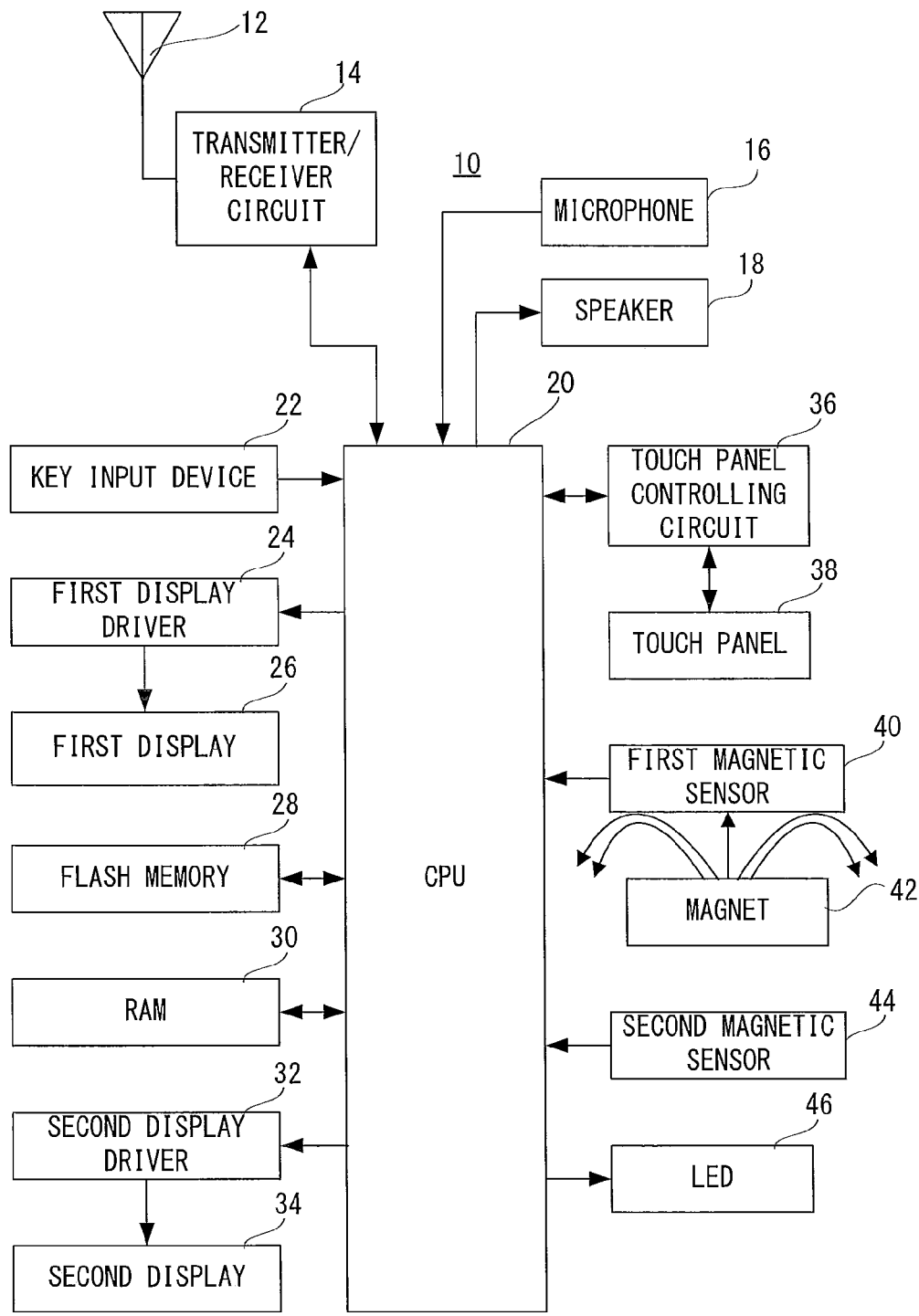
FIG. 1 is a block diagram showing an electric configuration of a mobile terminal of one embodiment of the present invention.

Referring to FIG. 1, a mobile terminal 10 includes a CPU (may be called a "processor or computer") 20 and a key input device 22 as an input device. The CPU 20 controls a transmitter/receiver circuit 14 compatible with a CDMA system to output a calling signal. The output calling signal is issued from an antenna 12 to mobile communication networks including base stations. When a communication partner performs an off-hook operation, a speech communication allowable state is established.

When a speech communication end operation is performed by the key input device 22 after a shift to the speech communication allowable state, the CPU 20 sends a speech communication end signal to the communication partner by controlling the transmitter/receiver circuit 14. Then, after sending a speech communication end signal, the CPU 20 ends the speech communication processing. Furthermore, in a case that a speech communication end signal from the communication partner is received as well, the CPU 20 ends the speech communication processing. In addition, in a case that a speech communication end signal from the mobile communication network is received independent of the communication partner, the CPU 20 ends the speech communication processing.

If a calling signal from the communication partner is received by the antenna 12 in a state that the mobile terminal 10 is started up, the transmitter/receiver circuit 14 notifies an incoming call to the CPU 20. The CPU 20 makes an LED 46 light up, and outputs an incoming call tone from the speaker not shown. Here, the CPU 20 may vibrate the mobile terminal 10 by driving (rotating) a motor not shown to thereby notify the incoming call to the user.

Then, the CPU 20 controls the first display driver 24 or the second display driver 32 to thereby display calling source information sent together with the calling signal from the communication partner on the first display 26 or the second display 34.

In the speech communication allowable state, the following processing is executed. A modulated audio signal (high frequency signal) sent from the communication partner is received by the antenna 12. The received modulated audio signal is subjected to demodulation processing and decode processing by the transmitter/receiver circuit 14. Then, the received voice signal that is obtained is output from the speaker 18. On the other hand, a voice signal to be transmitted that is captured by the microphone 16 is subjected to encoding processing and modulation processing by the transmitter/receiver circuit 14. Then, the generated modulated audio signal is sent to the communication partner by means of the antenna 12 as described above.

A touch panel 38 is a pointing device for designating an arbitrary position within the screen of the second display 34. When the touch panel 38 is operated by being pushed, stroked, or touched on its top surface with the finger of the user, it detects the operation. Then, when the finger touches the touch panel 38, a touch panel controlling circuit 36 specifies the position of the finger, and outputs coordinate data of the operated position to the CPU 20. That is, the user can input to the mobile terminal 10 a direction of an operation and a design by pushing, stroking, touching, or the like the top surface of the touch panel 38.

Also, the touch panel 38 is a system called an electrical capacitive type in which changes in capacitances between electrodes occurring by an approach of the finger to the surface of the touch panel 38, and detects a touch on the touch panel 38 by one or a plurality of fingers. More specifically, the touch panel 38 adopts a projected capacitive type for detecting changes in capacitances between the electrodes occurring by approach of the finger on a transparent film formed with the electrode patterns. Here, the detection system may include a surface capacitive type, and may also include a resistance film type, a ultrasonic type, an infrared ray type, an electromagnetic induction type, etc.

It should be noted that an operation of touching the top surface of the touch panel 38 with the finger by the user shall be referred to as "touch". On the other hand, an operation of releasing the finger from the touch panel 38 shall be referred to as "release". Then, the coordinates indicated by a touch shall be referred to as a "touched point", and the coordinates indicated by a release shall be referred to as a "released point". In addition, an operation of touching the top surface of the touch panel 38 and then releasing it shall be referred to as a "touch and release". Then, an operation, such as "touch", "release" and "touch and release" performed on the touch panel 38 shall generally be referred to as a "touch operation".

Here, the touched point is barycentric coordinates of an area of the finger touching the touch panel 38. Furthermore, a specialized touch pen, etc. for performing a touch operation may be provided. In addition, an origin point of the display coordinates of the second display 34 and the touched position coordinates of the touch panel 38 shall be an upper left. That is, the abscissa is larger from the upper left to an upper right, and the ordinate is larger from the upper left to a lower left. At this time, the CPU 20 and the touch panel 38 function as a touch operation detector.

Furthermore, the mobile terminal 10 has a mail function capable of making data communication with a mail server not shown, and transmitting and receiving mail messages. Here, during the data communication, the antenna 12 and the transmitter/receiver circuit 14 function as a communication unit, and the mail server, etc. is connected to networks by wire or wirelessly.

In addition, the mobile terminal 10 has a music player function for managing and reproducing sound data stored in a RAM 30. When making a reproducing operation of the sound data, he or she can enjoy playing music by utilizing the mobile terminal 10.

Figure 2:
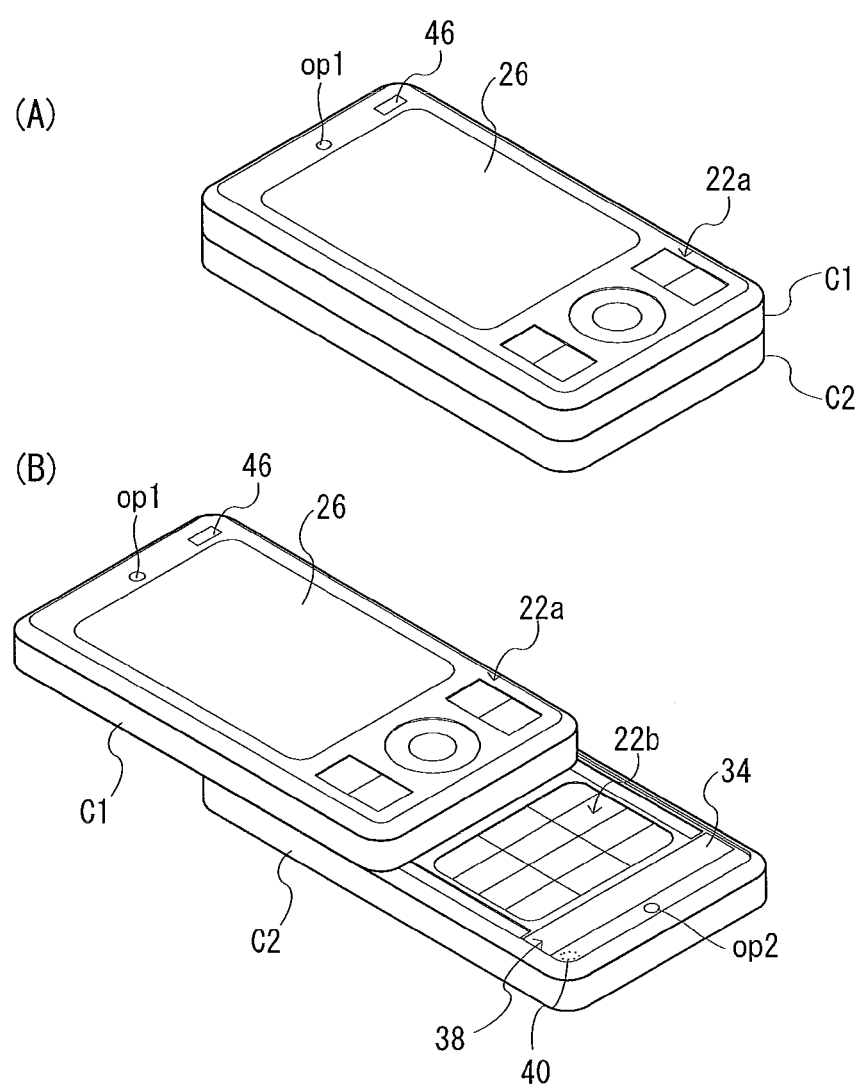
FIG. 2 is an illustrative view showing one example of an appearance of the mobile terminal shown in FIG. 1.

FIG. 2 (A) is an illustrative view showing an appearance of the mobile terminal 10 in a closed position, and FIG. 2 (B) is an illustrative view showing an appearance of the mobile terminal 10 in an open position. With reference to FIG. 2 (A) and FIG. 2 (B), the mobile terminal 10 has a first case C1 (first housing) and a second case C2 (second housing) each being configured in the form of plate. Furthermore, the first case C1 and the second case C2 are approximately the same in thickness, and the first case C1 is coupled with the second case C2 by means of a sliding mechanism 50 (see FIG. 3) so as to be stacked (piled) on the second case C2. The first case C1 can be slid in a longitudinal direction of the second case C2. Here, the antenna 12 is contained in the first case C1 or the second case C2, and is not illustrated in FIG. 2 (A) and FIG. 2 (B).

Also, the microphone 16 not shown is contained in the second case C2, and an opening OP2 communicating with the contained microphone 16 is provided at one end of the top surface in the longitudinal direction of the second case C2. Similarly, the speaker 18 not shown is contained in the first case C1, and an opening OP1 communicating with the contained speaker 18 is provided at the one end of the top surface in the longitudinal direction of the first case C1.

The key input device 22 is made up of a first keypad 22a and a second keypad 22b each including a plurality of keys. The first keypad 22a is constructed of a direction key, a talk key, an on-hook key, a menu key and a decision key, and is provided on the top surface of the first case C1. Also, the second keypad 22b is made up of numeric keys of 0 to 9, and is provided on the top surface of the second case C2. In addition, the first display 26 is attached such that its monitor screen is exposed from the top surface of the first case C1. The second display 34 is attached such that its monitor screen is exposed from the top surface of the second case C2. In addition, on the surface of the second display 34, the touch panel 38 is provided. The LED 46 is attached such that its light-emission unit is exposed from the main surface at the one end in the longitudinal direction of the first case C1.

For example, the user can input a phone number by operating the numeric keys of 0 to 9 while viewing the first display 26, and can perform an incoming call operation by the talk key. Then, the user can perform a speech communication end operation by the on-hook key. Furthermore, the user can display a menu screen by operating the menu key, and select an arbitrary menu by the direction key. The user can decide the selected menu by operating the decision key.

Moreover, the user can turn on or off the power of the mobile terminal 10 by holding the on-hook key on. Additionally, in this embodiment, the area of the second display 34 is smaller than that of the first display 26. Thus, power consumption of the second display 34 is lower than that of the first display 26.

A first magnetic sensor 40 is contained in the one end of the second case C2 in the longitudinal direction. A magnet 42 is contained in the other end of the first case C1 in the longitudinal direction in so as to be the closest position with the first magnetic sensor 40 in the state shown in FIG. 2 (A). A second magnetic sensor 44 is contained near the center of the second case C2 so as to be closest to the magnet 42 in the open position shown in FIG. 2 (B).

Then, the first magnetic sensor 40 for detecting the closed position of the mobile terminal 10 outputs a maximum value in the state shown in FIG. 2 (A). On the other hand, the second magnetic sensor 44 for detecting the open position of the mobile terminal 10 outputs a maximum value in the state shown in FIG. 2 (B). That is, the CPU 20 detects the closed position when the first magnetic sensor 40 outputs the maximum value, and detects the open position when the second magnetic sensor 44 outputs the maximum value.

Here, in this embodiment, a state in which the first magnetic sensor 40 and second magnetic sensor 44 do not output the maximum values is called a "sliding position". For example, when the user slides the first case C1 from the closed position, the mobile terminal 10 is switched from the closed position to the sliding position. When the user further slides the first case C1, the mobile terminal 10 is switched from the sliding position to the open position.

Thus, the second display 34 is provided in such a position so as not be exposed in the home position (closed position), and to be exposed when a sliding operation is performed.

Here, the first case C1 and the second case C2 are electrically connected by a flexible harness which is unaffected by sliding. Furthermore, in another external view, reference numerals of the first keypad 22a, the second keypad 22b, the first display 26, the second display 34, the touch panel 38, the first magnetic sensor 40, the LED 46, the opening OP1 and the opening OP2 may be omitted for simplicity. In addition, in this embodiment, the CPU 20, the first magnetic sensor 40 and the magnet 42 function as a closed position detector, and the CPU 20, the magnet 42 and the second magnetic sensor 44 function as an open position detector.

Figure 3:
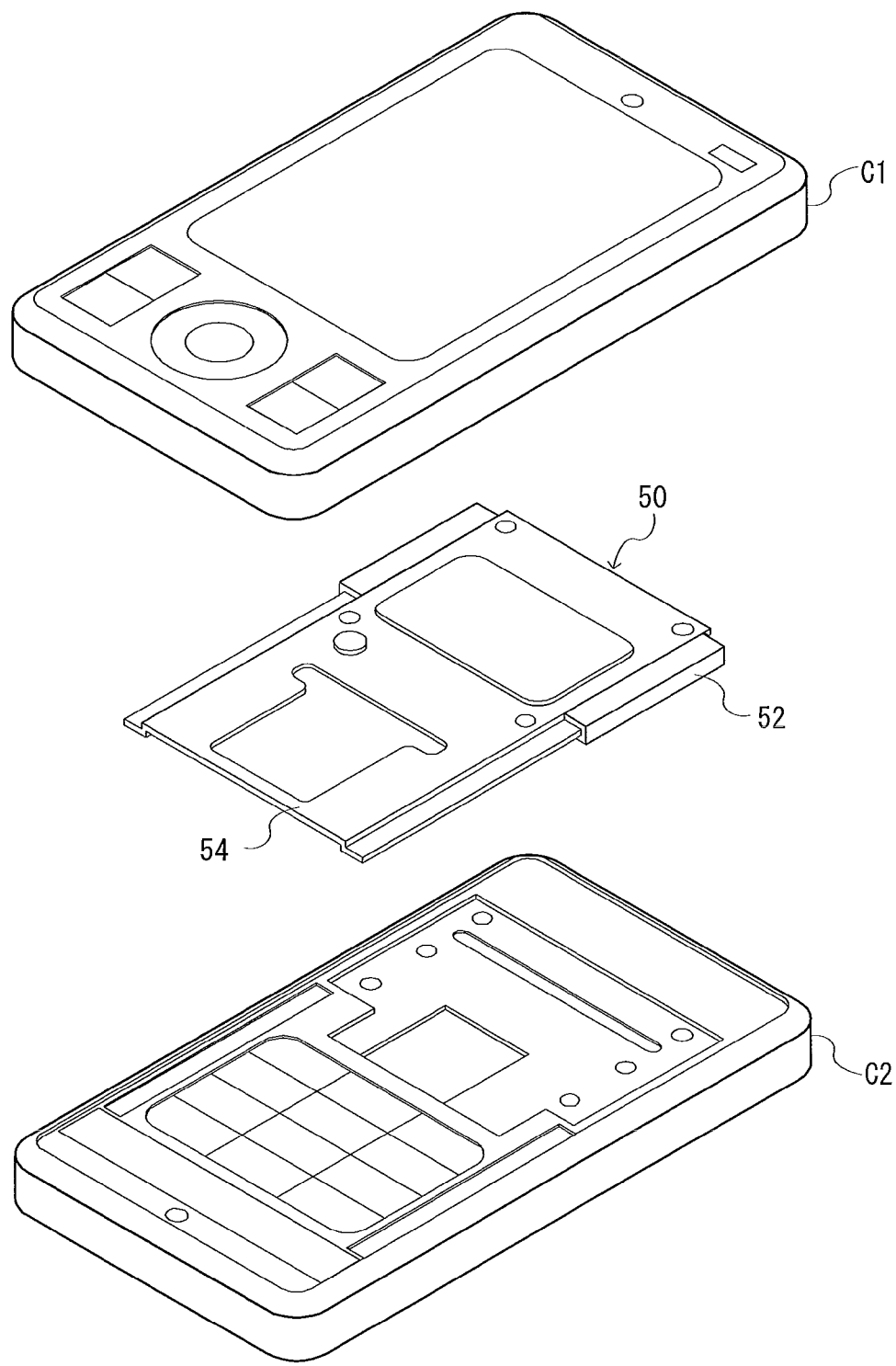
FIG. 3 is an illustrative view showing one example of an appearance of a sliding mechanism included in the mobile terminal shown in FIG. 1.
Figure 4:
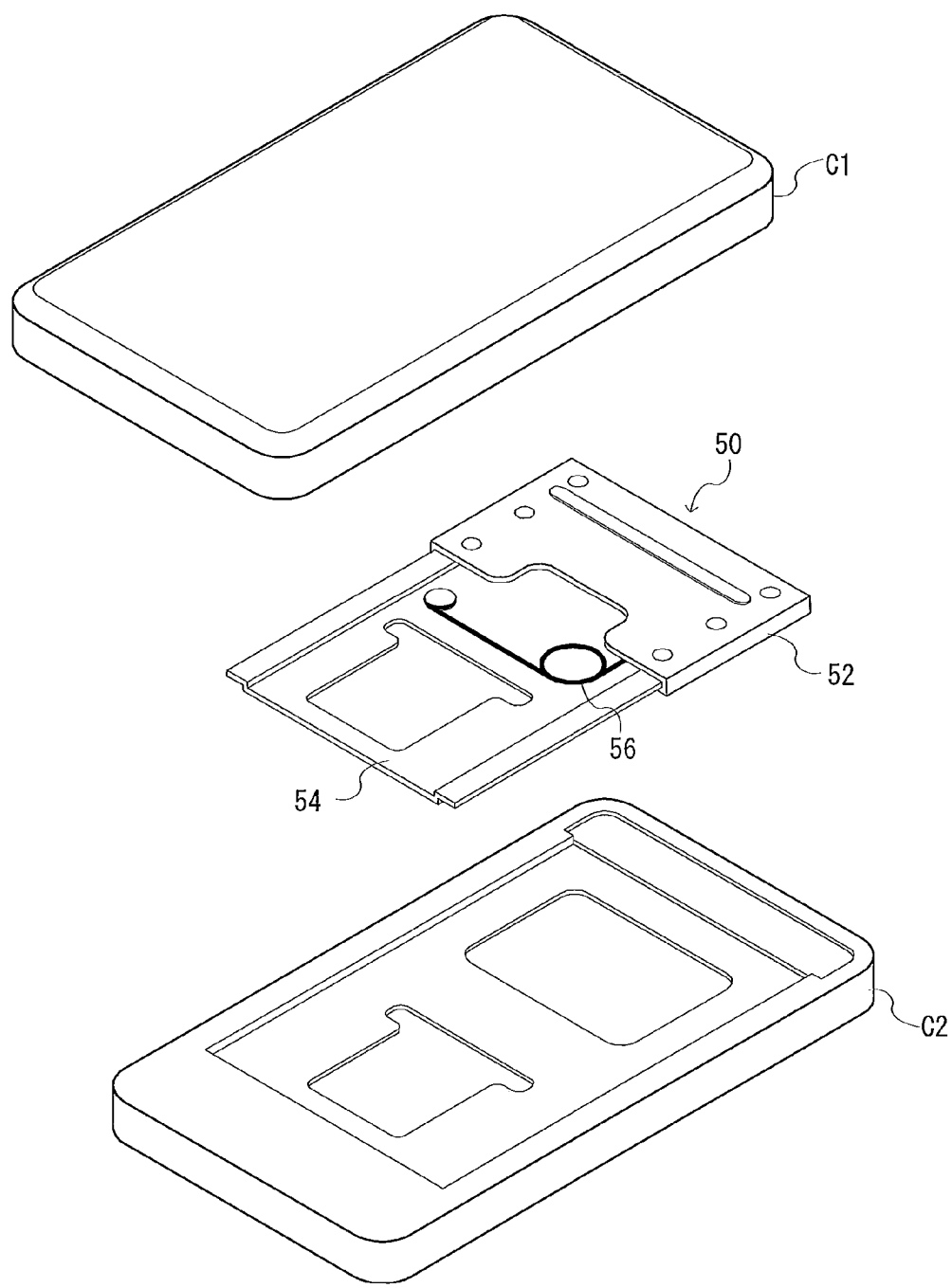
FIG. 4 is an illustrative view showing another example of an appearance of the sliding mechanism shown in FIG. 3.

FIG. 3 is an illustrative view showing an appearance of a surface of the sliding mechanism 50, and FIG. 4 is an illustrative view showing an appearance of the underside of the sliding mechanism. Here, FIG. 3 and FIG. 4 show an appearance of the first case C1 and the second case C2 as well for clarifying the relationship between the sliding mechanism 50, and the first case C1 and the second case C2.

With reference to FIG. 3 and FIG. 4, the sliding mechanism 50 is made up of a first plate 52, a second plate 54 and a spring 56 functioning as a holder. Furthermore, the sliding mechanism 50 is positioned between the first case C1 and the second case C2. The first plate 52 is coupled to the top surface of the second case C2, and the second plate 54 is coupled to the bottom surface of the first case C1. Then, the first plate 52 is slidably engaged with the second plate 54. That is, the first plate 52 slides with respect to the second plate 54 to thereby slide the first case C1 with respect to the second case C2.

Here, in this embodiment, the first plate 52 and the second plate 54 may be coupled by being screw-held, or may be coupled by a recessed portion and a projected portion with respect to the first case C1 and the second case C2.

By utilizing FIG. 5(A) to FIG. 5(D), the spring 56 holding the mobile terminal 10 between the open position and the closed position is described in detail.

Figure 5:
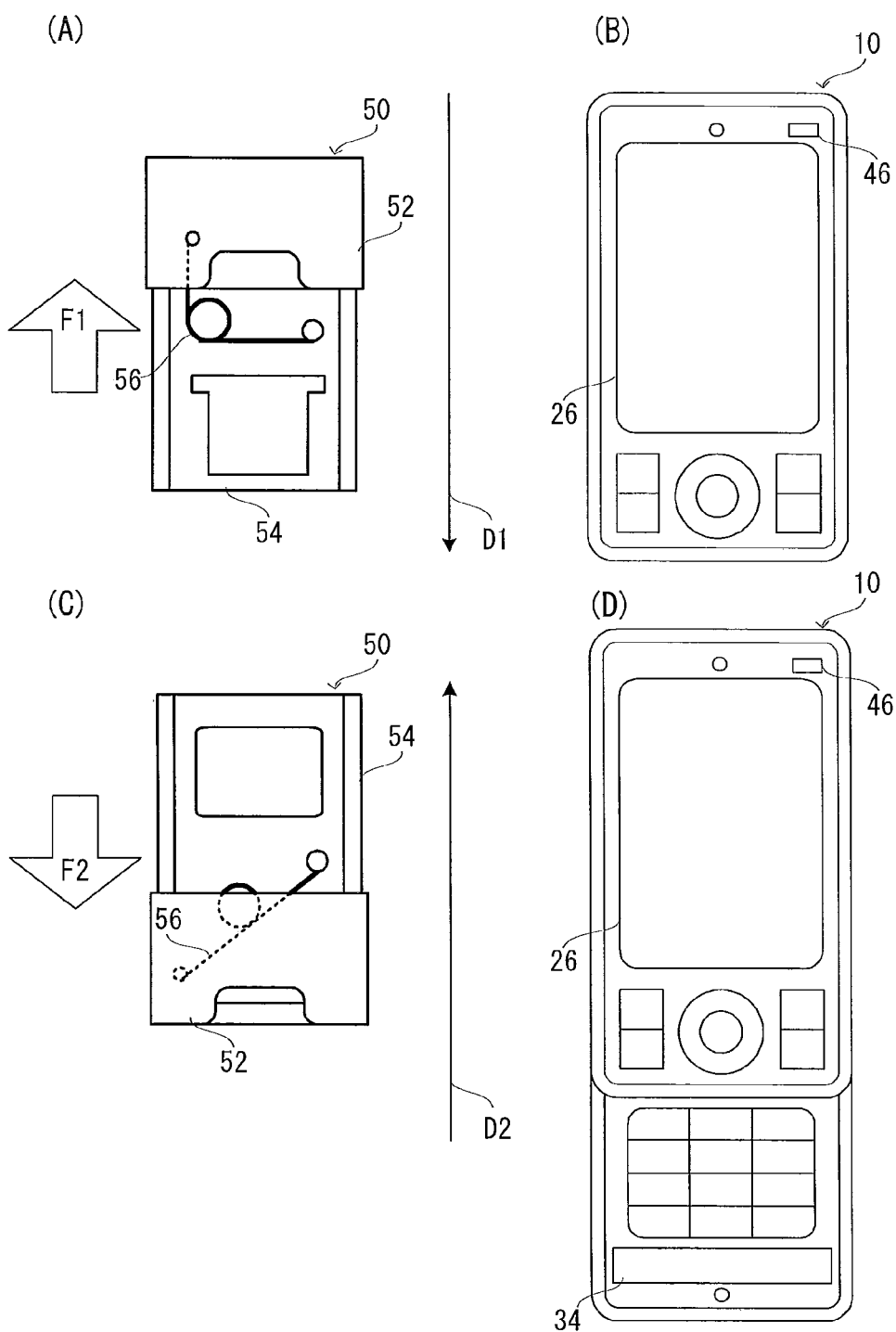
FIG. 5 is an illustrative view showing one example of an operation of a sliding function shown in FIG. 3.

With reference to FIG. 5(A), in a case that the mobile terminal 10 is in the closed position (FIG. 5(B)), the first plate 52 is positioned at an upper portion of the second plate 54, and this state between the first plate 52 and the second plate 54 is held by a force F1 of the spring 56. That is, even if an external force in the direction of an arrow D1 is applied to the mobile terminal 10 in the closed position, the closed position is held so long as the external force does not exceed the force F1 of the spring 56. In addition, even if the second case C2 slides with respect to the first case C1 in the direction of the arrow D1, so long as the amount of sliding does not exceed a predetermined amount, the sliding position is returned to the closed position by the force F1 of the spring 56.

Furthermore, if the amount of sliding exceeds the predetermined amount, the direction of the force F1 of the spring 56 is reversed to allow the force F2 to be exerted. Thus, the second case C2 is assisted to slide in the direction of an arrow D2 to switch to the open position shown in FIG. 5(D).

With reference to FIG. 5(C), in a case that the mobile terminal 10 is in the open position (FIG. 5(D)), the first plate 52 is positioned at a lower portion of the second plate 54, and by the force F2 of the spring 56, this state between the first plate 52 and the second plate 54 is held. That is, similar to the closed position, the open position of the mobile terminal 10 is held by the spring 56.

Thus, by the spring 56 belonging to the sliding mechanism 50, the mobile terminal 10 is held between the open position and the closed position, and a sliding operation with respect to the first case C1 or the second case C2 is assisted.

It should be noted that the "predetermined amount of sliding" in this embodiment is half the moving distance when the first case C1 slides from the closed position to the open position. For example, when the user performs a sliding operation of exposing only the second display 34 on the mobile terminal 10 in the closed position, and then stops performing the sliding operation, the mobile terminal 10 is returned from the sliding position to the closed position.

Furthermore, in the sliding mechanism of this embodiment, sliding is assisted by a single spring, but by using two or more springs, sliding may be assisted. In this embodiment, a coil spring is used as a spring 56, but other kinds of springs such as a plate spring, etc. may be used.

In this embodiment, here, the mobile terminal 10 has an electric power saving function, and the user can set the power saving mode to the mobile terminal 10. The power saving mode turns the power of the first display 26 off in a state that the frequency of use is high (specific state), such as an incoming call state, an incoming mail state and a standby state, etc. In addition, the mobile terminal 10 in the power saving mode displays predetermined information, such as notification information of an incoming call and an incoming mail, and mobile terminal information (time and a remaining capacity of the battery), etc. on the second display 34 only when a sliding operation is performed.

Figure 6:
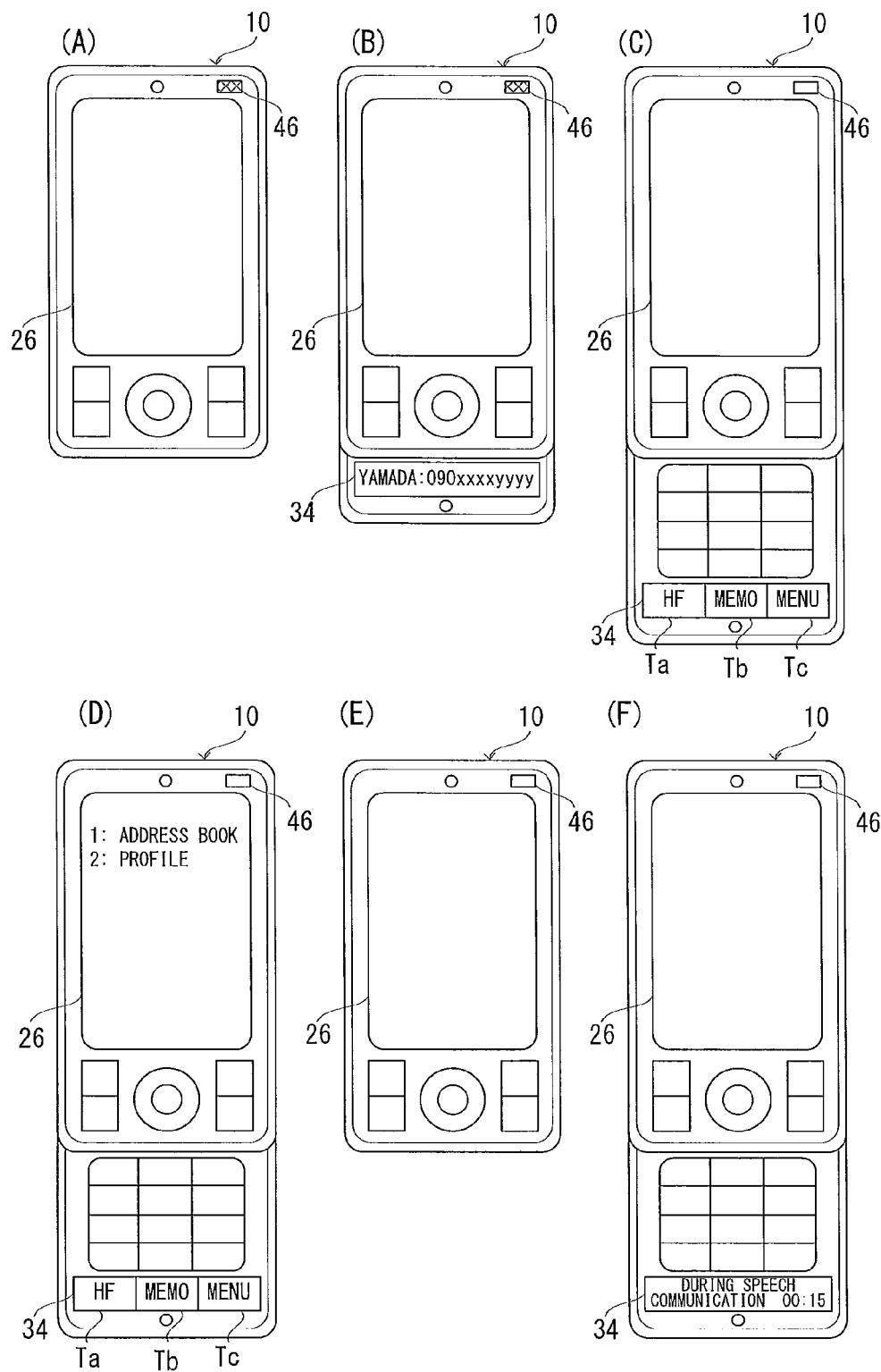
FIG. 6 is an illustrative view showing a display example of a first display and a second display of the mobile terminal when a sliding operation is performed in the appearance shown in FIG. 2.

With first reference to FIG. 6(A) to FIG. 6(F), a sliding operation during an incoming call (incoming call state) is explained. In the mobile terminal 10 during an incoming call, the LED 46 emits light (lights up) as shown in FIG. 6(A). When the user performs a sliding operation with respect to the mobile terminal 10 during the incoming call, calling source information is displayed on the second display 34. For example, with reference to FIG. 6(B), together with a phone number of the communication partner, a name of the communication partner corresponding to the phone number is displayed on the second display 34. Here, the name of the communication partner is displayed based on the address book data recorded in the RAM 30 of the mobile terminal 10.

When the user performs a further sliding operation to make a switch to the open position, a speech communication allowable state is established, and the light emission of the LED 46 is stopped. In addition, in the speech communication state, a plurality of function keys are displayed on the second display 34. The user performs a touch operation on the plurality of displayed function keys to thereby operate an arbitrary function key. For example, with reference to FIG. 6(C), an HF (Hands Free) key Ta, a memo key Tb and a menu key Tc are displayed on the second display 34. When the HF key Ta is operated, a switch to a hands free communication is made. Alternatively, when the memo key Tb is operated, the speech communication voice is recorded in the RAM 30. When the menu key Tc is operated, a menu screen is displayed on the first display 26 as shown in FIG. 6(D).

With then reference to FIG. 6(E), when the mobile terminal 10 is switched to the closed position during a state of a speech communication by a sliding operation, the mobile terminal 10 sends a speech communication end signal in the same way as an operation of the on-hook key to thereby end the speech communication processing. That is, the mobile terminal 10 is in a standby state. Furthermore, when the mobile terminal 10 is switched to the closed position, the displays of the first display 26 and the second display 34 are erased.

Thus, the user can make a speech communication with the communication partner after confirming the information of the communication partner.

Here, in a case that the speech communication allowable state is established, talking time may be displayed on the second display 34 as shown in FIG. 6(F). Additionally, when a sliding operation is suspended in the sliding position shown in FIG. 6(B) to return the mobile terminal 10 to the closed position, unattended answering processing is executed. In the unattended answering processing, after the speech communication allowable state is established, an answering message may be sent to the communication partner, or a speech communication end signal may be sent without establishing the speech communication allowable state. Also, taking an erroneous suspension of the sliding operation into consideration, even after a return to the closed position, the state during the incoming call (incoming call state) as shown in FIG. 6(A) may be placed, and kept for a predetermined time. In this case, after the predetermined time, the aforementioned unattended answering processing may be executed, or a speech communication end signal may be sent without establishing the speech communication allowable state.

Figure 7:
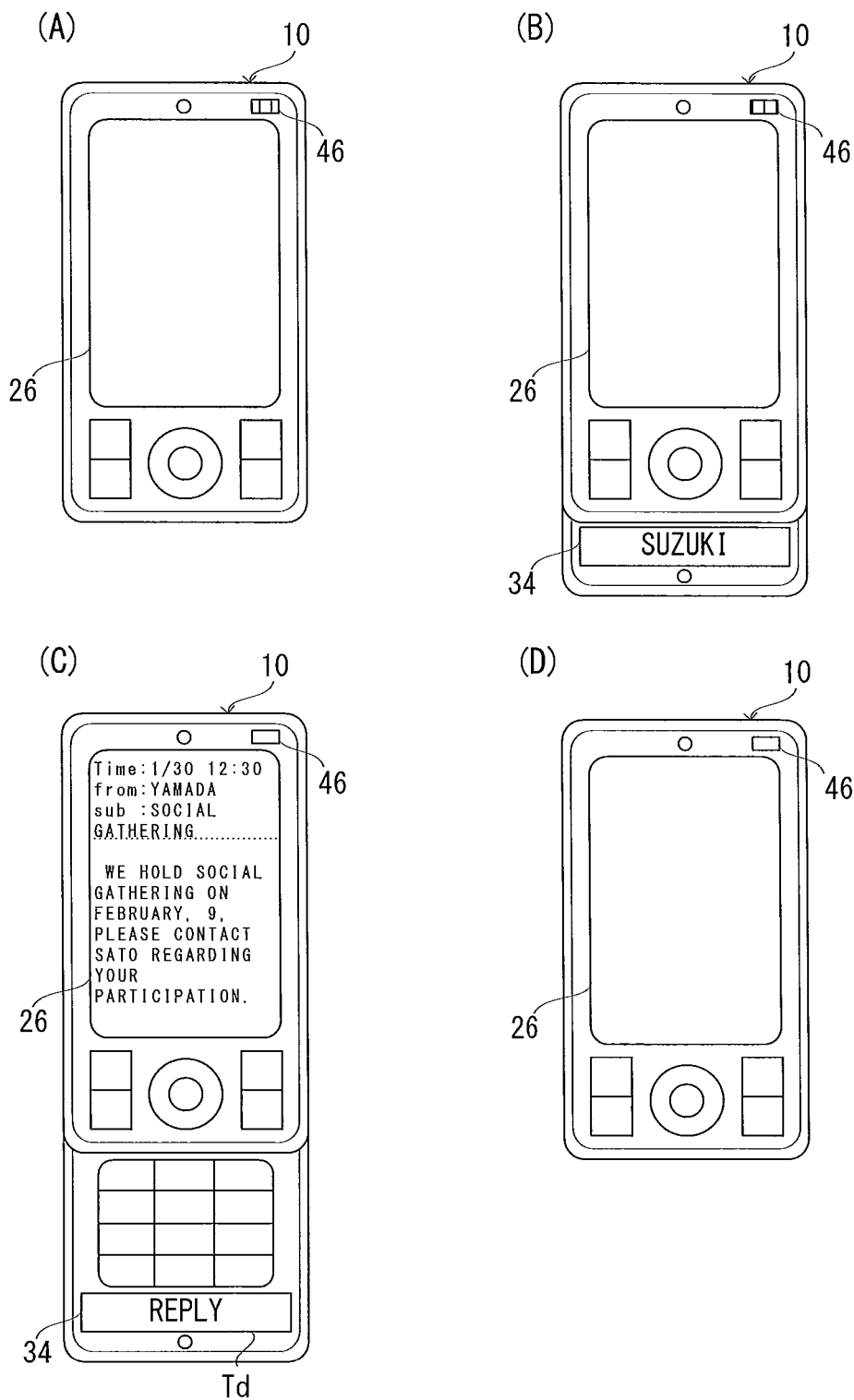
FIG. 7 is an illustrative view showing another display example of the first display and the second display when a sliding operation is performed in the mobile terminal with the appearance shown in FIG. 2.

By using FIG. 7(A) to FIG. 7(D), a sliding operation during an incoming mail (incoming mail state) is explained. With reference to FIG. 7(A), the mobile terminal 10 can notify an incoming mail by making the LED 46 emit light (light up) during the incoming mail similar to the during the incoming call case. Then, when the user performs a sliding operation during the incoming mail, header information of a mail message is displayed on the second display 34. For example, with reference to FIG. 7(B), a name of the sender is displayed on the second display 34. Also, only the header information of the mail message, such as a mail subject may be displayed, and it may be displayed together with the name of the sender.

When a further sliding operation is performed from the sliding position shown in FIG. 7(B) to thereby switch the mobile terminal 10 to the open position, a text of the newly received mail message (new mail message) is displayed on the first display 26 as shown in FIG. 7(C). In addition, a reply key Td is displayed on the second display 34. For example, the user operates the reply key Td to thereby display a reply mail creation screen on the first display 26.

Then, when a sliding operation is performed in the sliding position shown in FIG. 7(C) to thereby switch the mobile terminal 10 to the closed position, the displays of the first display 26 and the second display 34 are erased.

Thus, the user can display the text of the mail after confirming the sender of the mail message.

By using FIG. 8(A) to FIG. 8(D), a sliding operation during stand-by (standby state) is explained in detail. When a sliding operation is performed from the state shown in FIG. 8(A) to thereby switch the mobile terminal 10 to the sliding position, the mobile terminal information is displayed on the second display 34. For example, with reference to FIG. 8(B), a radio wave receiving state by the antenna 12, a remaining capacity of the rechargeable battery and current date and time, etc. are displayed as mobile terminal information on the second display 34.

Figure 8:
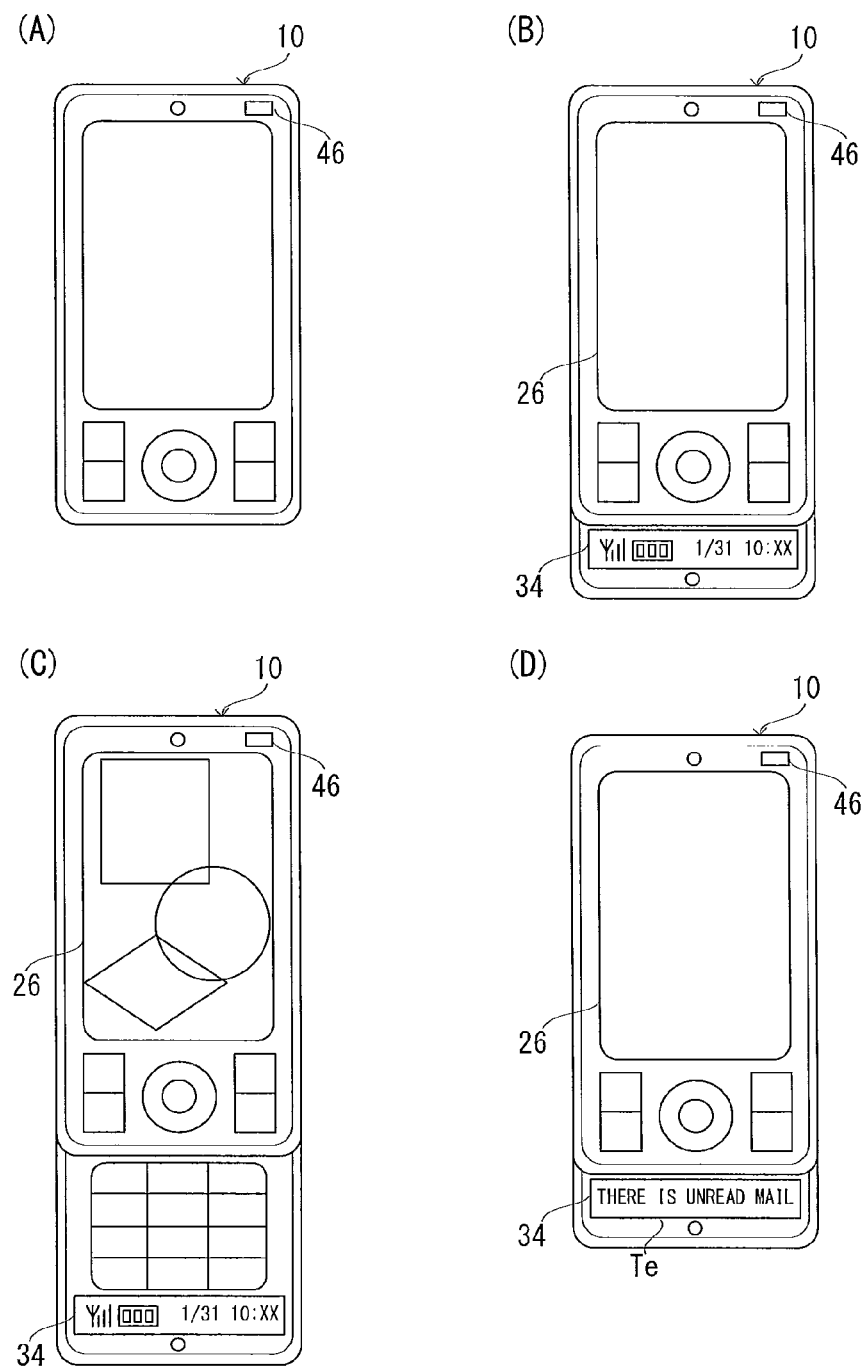
FIG. 8 is an illustrative view showing a still another display example of the first display and the second display when a sliding operation is performed in the mobile terminal with the appearance shown in FIG. 2.

When a further sliding operation is performed in a state shown in FIG. 8(B) to switch the mobile terminal 10 to the open position, a standby image indicating a standby state is displayed on the first display 26 as shown in FIG. 8(C).

In addition, with reference to FIG. 8(D), if the text of the mail message has never been confirmed, unread mail notifying information is displayed on the second display 34. For example, the unread mail notifying information is displayed by a character string "THERE IS UNREAD MAIL MASSAGE" and a dedicated image icon on the second display. The second display 34 on which the unread mail notifying information is displayed functions as a shortcut key Te. Then, the user operates the shortcut key 34Te to thereby display a mail folder screen on the first display 26.

Here, if a new mail message has not yet been confirmed, new mail message notifying information is displayed on the second display 34. For example, a character string of "THERE IS NEW MAIL MASSAGE" and a dedicated image icon are displayed on the second display 34 as new mail message notifying information.

Thus, in the mobile terminal 10 of this embodiment, it is possible to precisely provide information required by the user depending on the status of use. Furthermore, the user confirms the information displayed on the second display 34 and then performs a further sliding operation, to thereby easily perform the predetermined processing. The "predetermined processing" here is processing having a high probability of being executed in a specific state (speech communication processing, text displaying processing).

Figure 9:
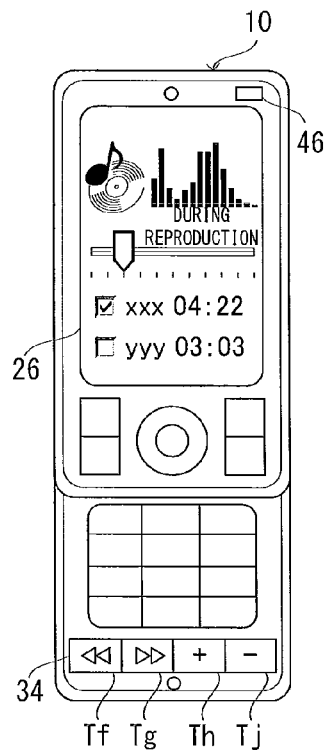
FIG. 9 is an illustrative view showing a further display example of the first display and the second display when a sliding operation is performed in the mobile terminal with the appearance shown in FIG. 2.

By using FIG. 9, here, a display of the second display 34 in a case that a display of an arbitrary function is executed is explained in detail. With reference to FIG. 9, in a case that a music player function is executed, a first music selection key Tf, a second music selection key Tg, a first volume key Th and a second volume key Tj are displayed on the second display 34. Then, when the first music selection key Tf is operated, a piece of music previously reproduced is selected, and when the second music selection key Tg is operated, a piece of music to be reproduced next is selected. Furthermore, when the first volume key Th is operated, a volume to be output from the speaker, etc. not shown is made low, and when the second volume key Tg is operated, the volume is made high.

Here, in a case that a browser function of browsing data of servers on the network is executed, an up and down scroll key for scrolling the displayed screen up and down and a right and left scroll key for scrolling it right and left are displayed on the second display 34. Additionally, in a case that a TV viewing function is executed in the mobile terminal 10 equipped with a TV tuner, a channel selection key and a volume key are displayed on the second display 34. In addition, in a case that a camera function is executed in the mobile terminal 10 equipped with a camera module, a zoom adjustment key, a brightness adjustment key, etc. are displayed on the second display 34.

Thus, it is possible to display the touch keys corresponding to the various functions to be executed in the mobile terminal 10 on the second display 34. This makes it possible for developers of the mobile terminal 10 to efficiently use the position where the second display 34 is provided in the mobile terminal 10 having a limited area for arranging the operation keys. Moreover, depending on the functions to be executed, the touch keys are displayed, and this makes it easy for the user to perform an input operation with respect to the function to be executed.

Figure 10:
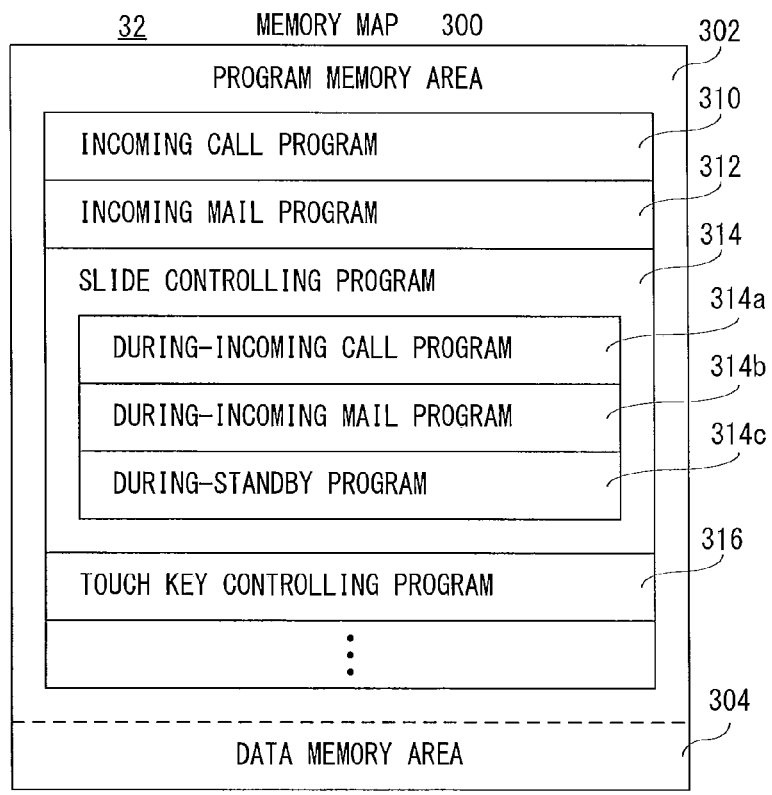
FIG. 10 is an illustrative view showing one example of a memory map of a RAM shown in FIG. 1.

FIG. 10 is an illustrative view showing a memory map of the RAM 30. With reference to FIG. 10, in the memory map of the RAM 30, a program memory area 302 and a data memory area 304 are included. A part of programs and data are read entirely at a time, or partially and sequentially as necessary from the flash memory 28, stored in the RAM 30, and then executed by the CPU 20, etc.

The program memory area 302 stores a program for operating the mobile terminal 10. The program for operating the mobile terminal 10 is made up of an incoming call program 310, an incoming mail program 312, a slide controlling program 314, a touch key controlling program 316, etc.

The incoming call program 310 is a program for continuously confirming reception of an incoming call signal, and also performs incoming call state processing, etc. for lighting up the LED 46. The incoming mail program 312 is a program for successively confirming a notification of a new mail message from the mail server. The slide controlling program 314 is a program for controlling a display of the second display 34 when a sliding operation is performed, and further includes a during-incoming call program 314a, a during-incoming mail program 314b and a during-standby program 314c.

The during-incoming call program 314a is a program for controlling a display of the second display 34 when a sliding operation is performed during an incoming call. The during-incoming mail program 314b is a program for controlling a display of the second display 34 when a sliding operation is performed during an incoming mail. The during-standby program 314c is a program for controlling a display of the second display 34 when a sliding operation is performed during standby.

The touch key controlling program 316 is a program for controlling the touch keys (first music selection key Tf, first volume key Th, etc.) displayed on the second display 34 when an arbitrary function is executed.

Although illustration is omitted, the program for operating the mobile terminal 10 includes a program for managing the received mail messages and the sent mail messages, a program for making data communication with a server on a network, a program for managing and reproducing sound data, etc.

Figure 11:
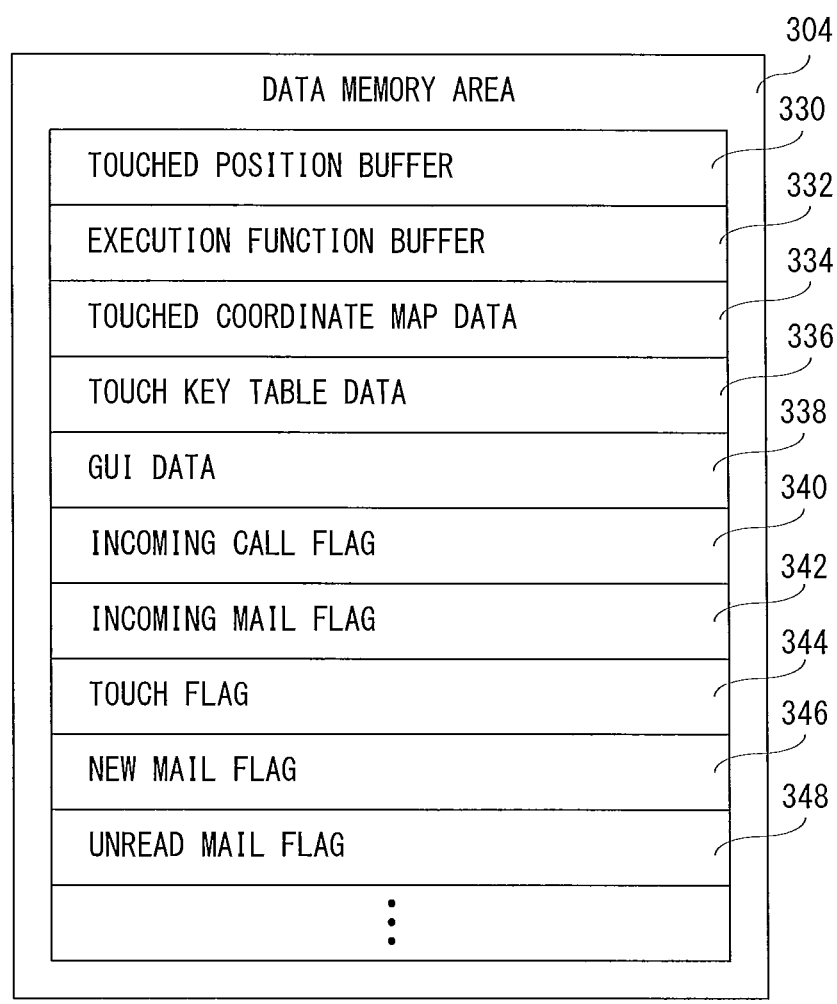
FIG. 11 is an illustrative view showing one example of a data memory area shown in FIG. 10.

With reference to FIG. 11, in the data memory area 304, a touched position buffer 330, an execution function buffer 332, etc. are provided. Furthermore, in the data memory area 304, touched coordinate map data 334, touch key table data 336, GUI data 338, etc. are stored, and an incoming call flag 340, an incoming mail flag 342, a touch flag 344, a new mail flag 346, an unread mail flag 348, etc. are provided.

The touched position buffer 330 is a buffer for temporarily storing an input result by a touch, etc. detected by the touch panel 38, and temporarily stores coordinate data of a touched point and a release point. The execution function buffer 332 is a buffer in which the data to be stored is changed depending on the processing for managing the function to be executed.

Here, each of all the functions to be executed by the mobile terminal 10 assigns a function ID, and in the execution function buffer 332, a function ID of the function which is currently being executed by the CPU 20 is stored.

The touched coordinate map data 334 is data for bringing coordinates such as a touched point specified by the touch panel controlling circuit 36 into correspondence with display coordinates on the second display 34. That is, the CPU 20 can bring a result of a touch operation performed on the touch panel 38 based on the touched coordinate map data 334 into correspondence with the display of the second display 34.

The touch key table data 336 is table data in which data indicating whether or not a display of the touch keys is necessary, and data indicating the kind of the touch keys to be displayed in a case that the display of the touch key is necessary are recorded bringing them into correspondence with the function ID. The GUI data 338 is image data of a GUI to be displayed on the first display 26 and the second display 34, and includes image data for displaying the touch keys, for example.

The incoming call flag 340 is a flag for determining whether or not an incoming call signal is received. For example, the incoming call flag 340 is made up of one bit register. When the incoming call flag 340 is turned on (established), a data value "1" is set to the register. On the other hand, when the incoming call flag 340 is turned off (not established), a data value "0" is set to the register.

The incoming mail flag 342 is a flag for determining whether a new mail message receiving state or not. Additionally, the touch flag 344 is a flag for determining whether the touch panel 38 is touched. The new mail flag 346 is a flag for determining whether or not a sliding operation is made after receiving a new mail message. The unread mail flag 348 is a flag for determining whether or not the text of the new mail message is displayed. Here, the configuration of each of the incoming mail flag 342, the touch flag 344, the new mail flag 346 and the unread mail flag 348 is the same as that of the incoming call flag 340, and thus, the detailed explanation therefor is omitted.

Although illustration is omitted, in the data memory area 304, address book data being made up of phone numbers set to other mobile terminals 10, user profile data are stored, and counters and flags necessary for operating the mobile terminal 10 are also provided.

Figure 12:
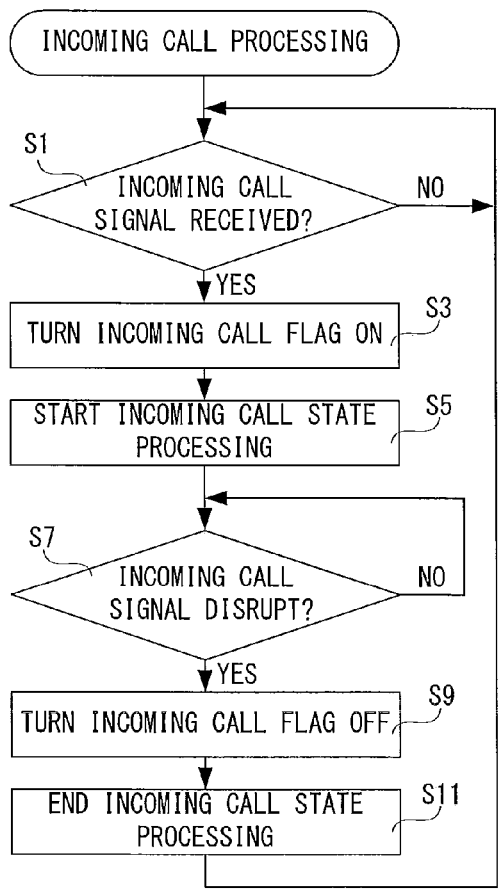
FIG. 12 is a flowchart showing incoming call processing by a CPU shown in FIG. 1.
Figure 13:
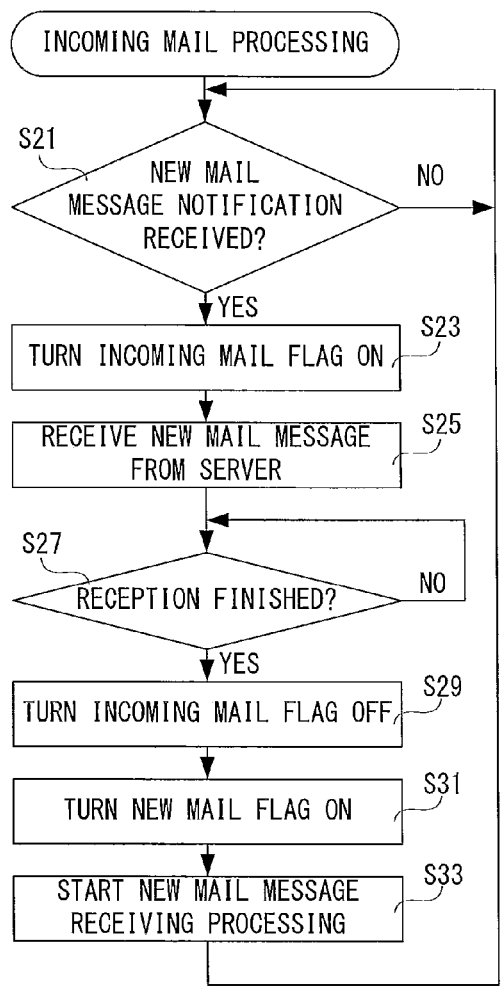
FIG. 13 is a flowchart showing incoming mail processing by the CPU shown in FIG. 1.
Figure 14:
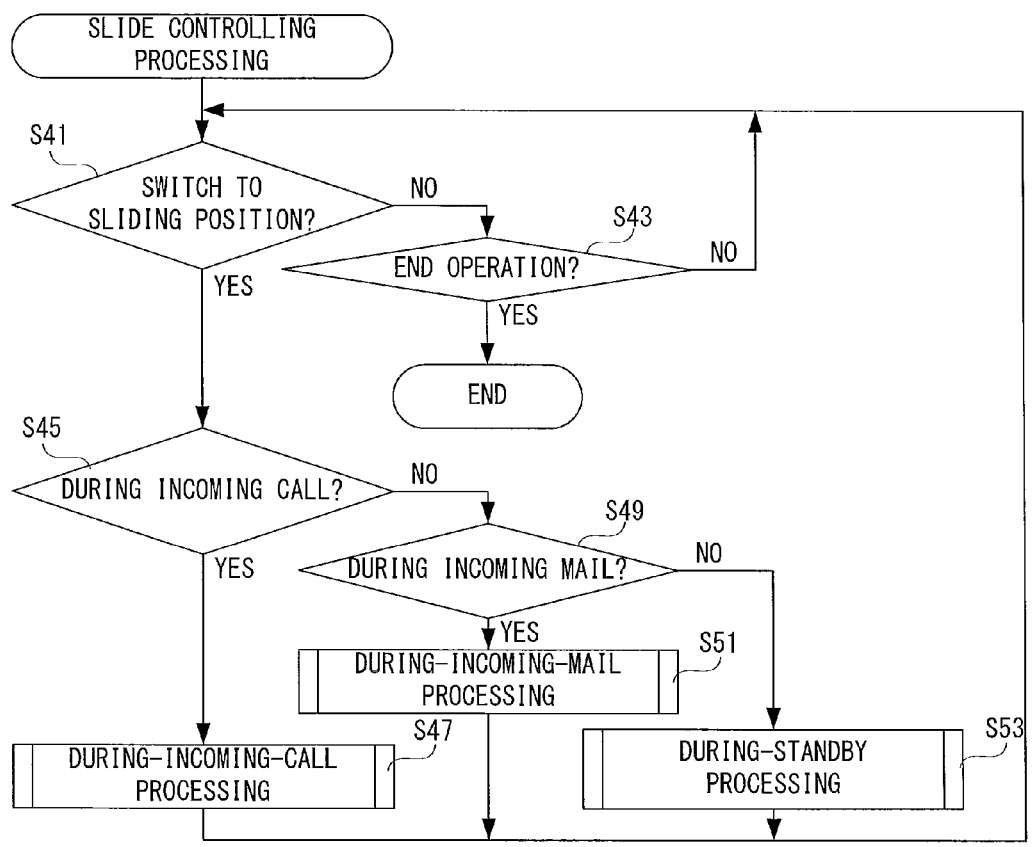
FIG. 14 is a flowchart showing slide controlling processing by the CPU shown in FIG. 1.
Figure 15:
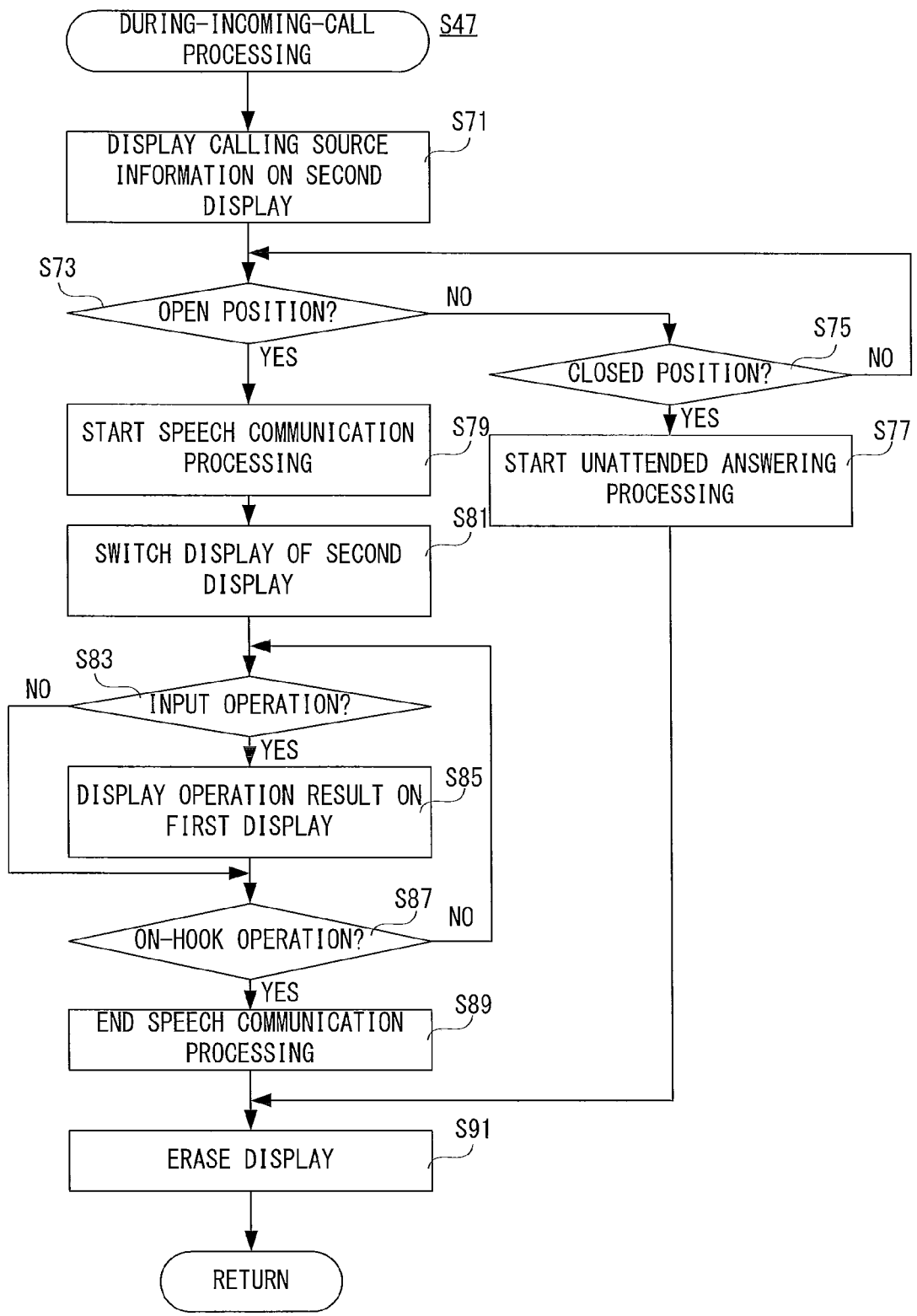
FIG. 15 is a flowchart showing during-incoming-call processing by the CPU shown in FIG. 1.
Figure 16:
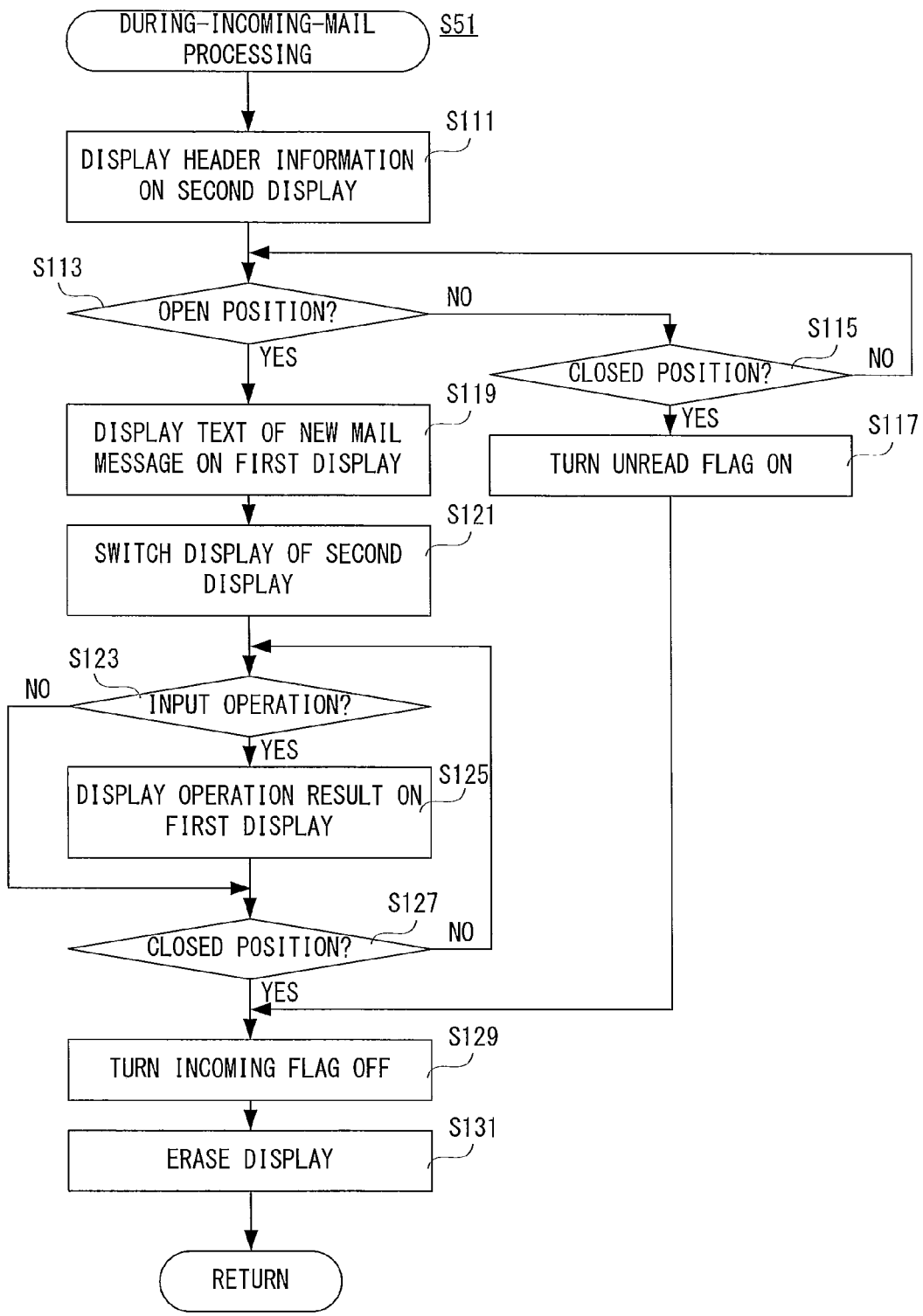
FIG. 16 is a flowchart showing during-incoming-mail processing by the CPU shown in FIG. 1.
Figure 17:
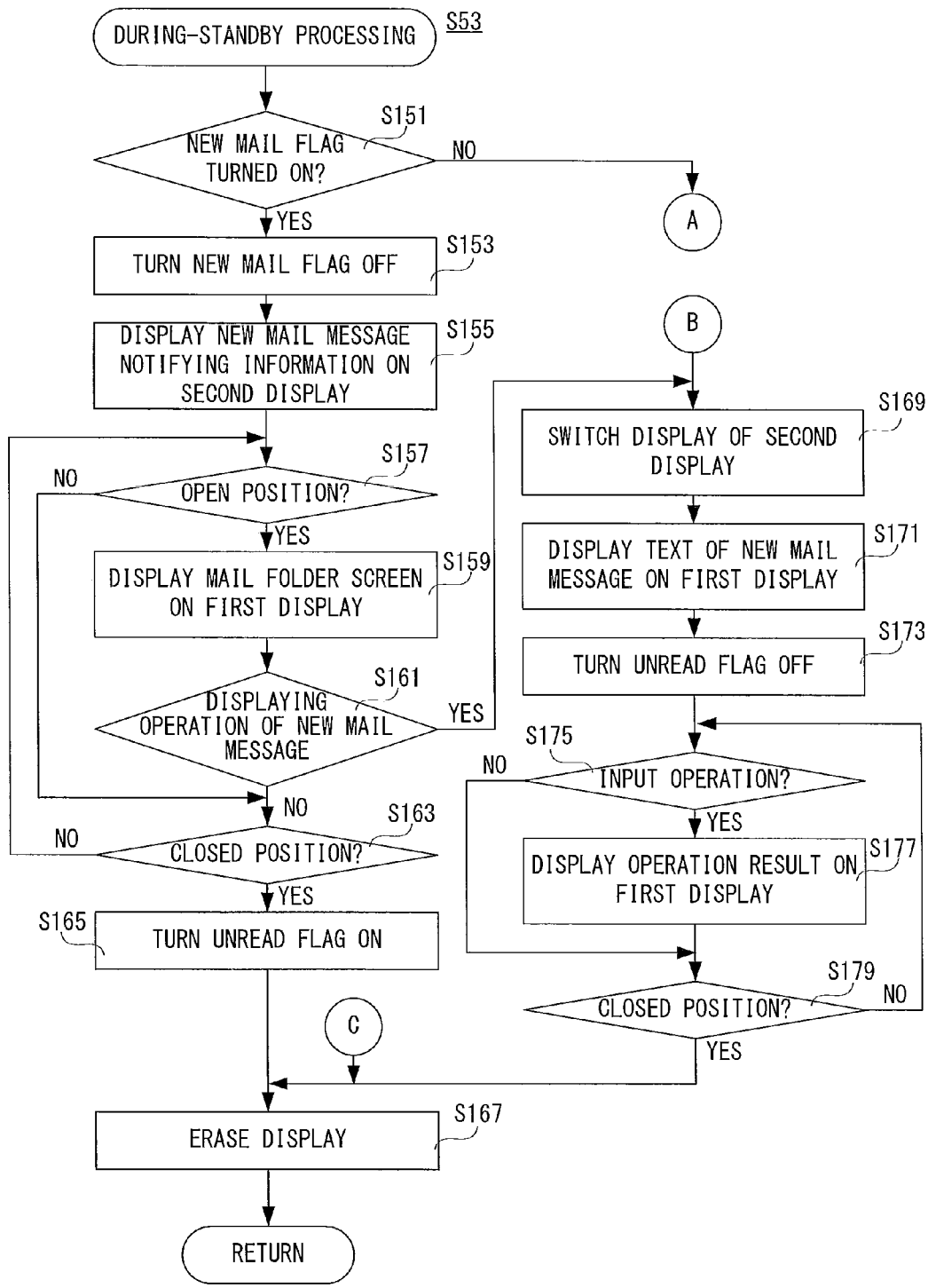
FIG. 17 is a flowchart showing a part of during-standby processing by the CPU shown in FIG. 1.
Figure 18:
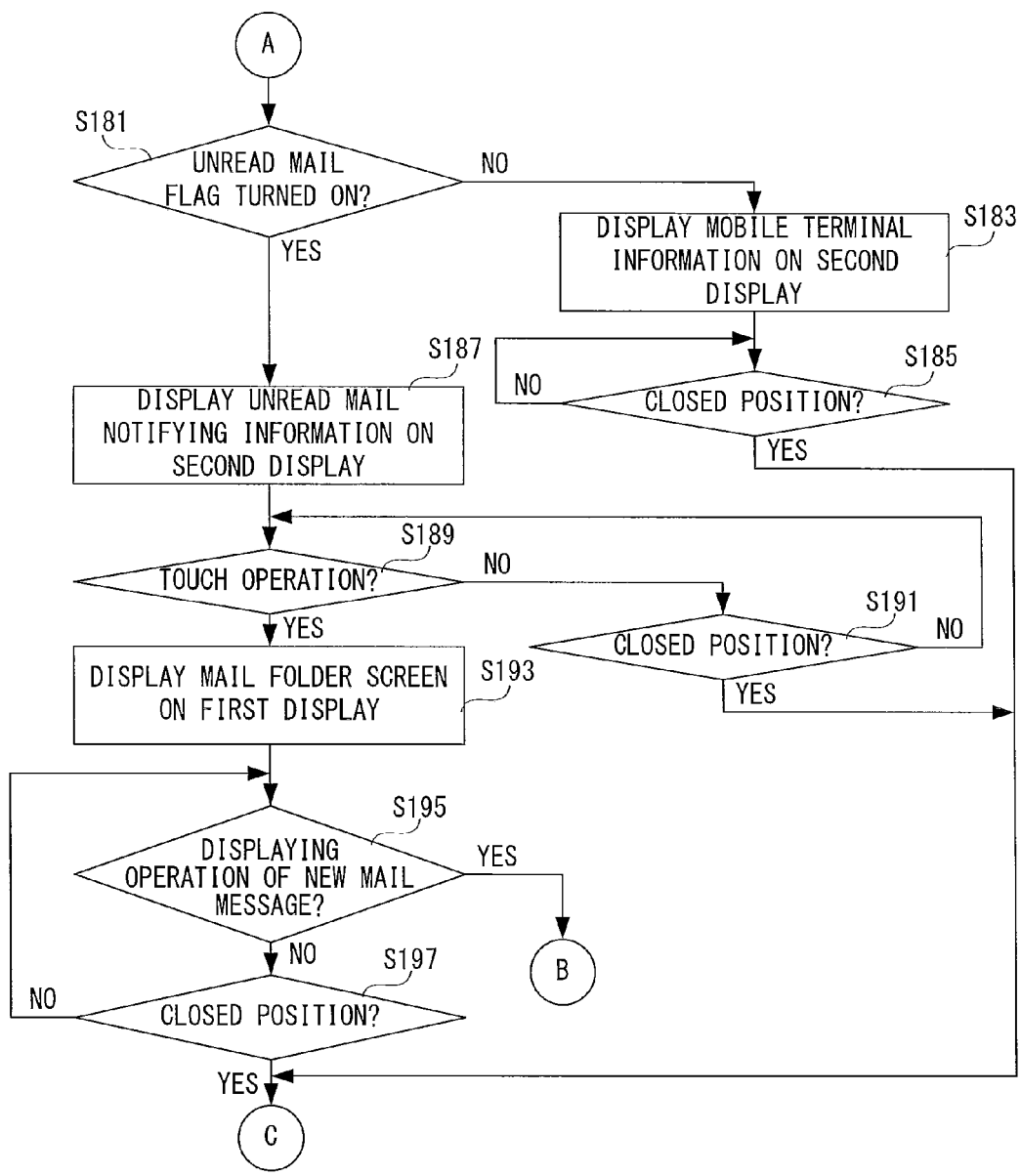
FIG. 18 is a flowchart showing another part of the during-standby processing by the CPU shown in FIG. 1 being sequel to FIG. 17.
Figure 19:
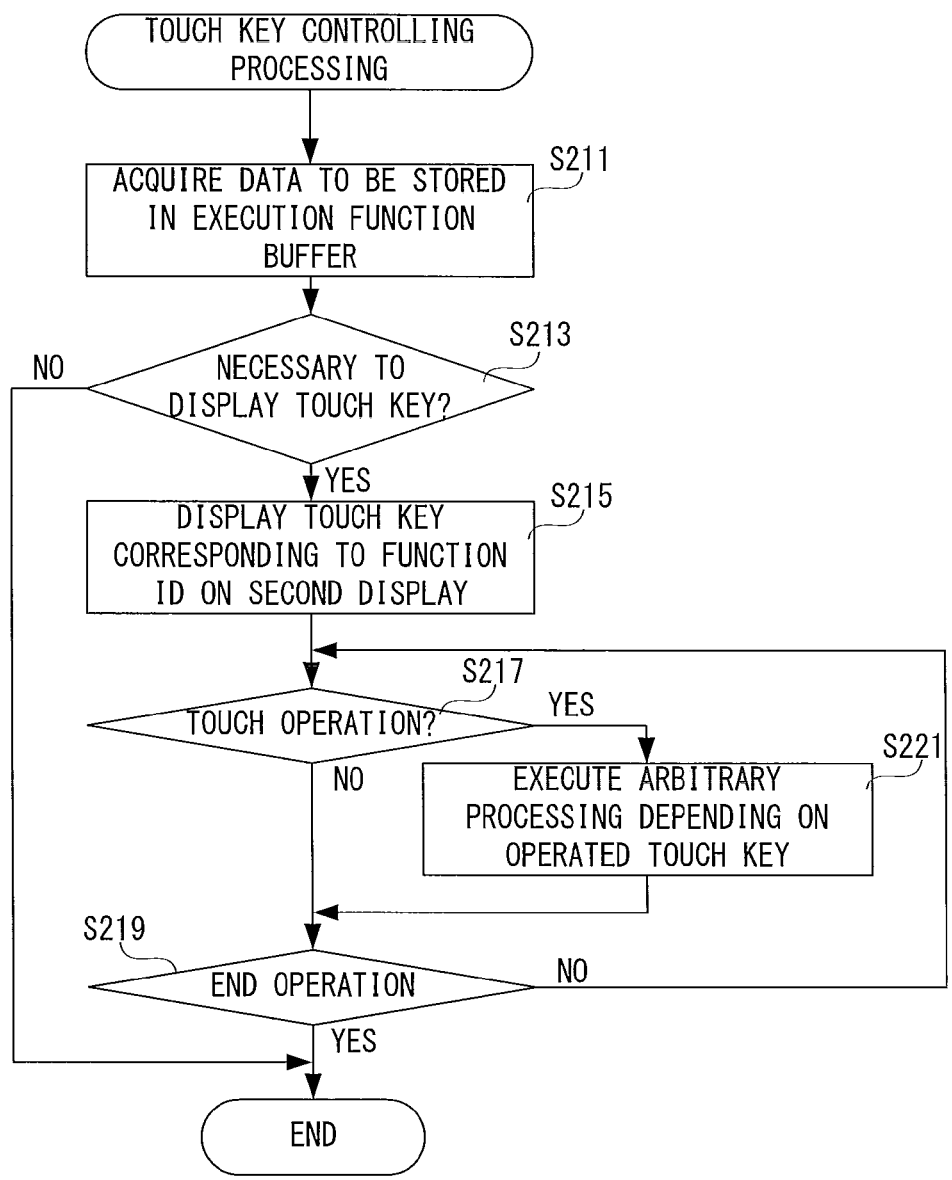
FIG. 19 is a flowchart showing a touch key controlling processing by the CPU shown in FIG. 1.

The CPU 20 executes, in parallel, a plurality of tasks including incoming call processing shown in FIG. 12, incoming mail processing shown in FIG. 13, slide controlling processing shown in FIG. 14, during-incoming-call processing shown in FIG. 15, during-incoming-mail processing shown in FIG. 16, during-standby processing shown in FIG. 17 and FIG. 18 and touch key controlling processing shown in FIG. 19, etc. under the control of RTOS (Real-time Operating System), such as "Linux (registered trademark)", "REX", etc.

FIG. 12 is a flowchart showing the incoming call processing. For example, when the power of the mobile terminal 10 is turned on, the CPU 20 determines whether or not an incoming call signal is received in a step S1. That is, it is determined whether or not an incoming call signal from a communication partner is received by the antenna 12, and the incoming call from the transmitter/receiver circuit 14 is notified. If "NO" in the step S1, that is, if the incoming call signal is not received by the antenna 12, processing in the step S1 is repeated until the incoming call signal is received. On the other hand, if "YES" in the step S1, that is, if the incoming call signal is received by the antenna 12, the incoming call flag 340 is turned on in a step S3. Succeedingly, in a step S5, incoming call state processing is started. In the incoming call state processing, the LED 46 is lit up, for example. Also, in the incoming call state processing, by rotations of a motor not shown, the mobile terminal 10 is vibrated, or an incoming call tone is output from the speaker not shown.

Succeedingly, in a step S7, it is determined whether or not an incoming call signal quits. For example, it is determined whether or not the incoming call signal disrupts in response to an establishment of the speech communication allowable state. If "NO" in the step S7, that is, if the incoming call signal is received by the antenna 12, the processing in the step S7 is repeated. On the other hand, if "YES" in the step S7, that is, if the incoming call signal is not received by the antenna 12, the incoming call flag 340 is turned off in a step S9, and the incoming call state processing is ended in a step S11. Then, after completion of the processing in the step S11, the process returns to the step S1. That is, in the step S11, the LED 46 is lit out. Also, the rotation of the motor not shown is stopped, and the output from the speaker not shown is stopped.

FIG. 13 is a flowchart showing the incoming mail processing. For example, when the power of the mobile terminal 10 is turned on, the CPU 20 determines whether or not a new mail message is received in a step S21. That is, it is determined whether or not a new mail message notification from a mail server not shown is received by the antenna 12. If "NO" in the step S21, that is, if the new mail message notification is not received, the processing in the step S21 is repeatedly executed. On the other hand, if "YES" in the step S21, that is, if the new mail message notification is received, the incoming mail flag 342 is turned on in a step S23, and a new mail message is received from the server in a step S25. That is, in the step S25, new mail message data is received from the mail server.

In a step S27, it is determined whether or not the reception has been finished. That is, it is determined whether or not receiving all the new mail message data from the mail server has already been finished. If "NO" in the step S27, that is, if receiving the new mail message has not been finished, the processing in the step S27 is repeatedly executed. On the other hand, if "YES" in the step S27, that is, if receiving the new mail message has already been finished, the incoming mail flag 342 is turned off in a step S29, and the new mail flag 346 is turned on in a step S31. Succeedingly, in a step S33, new mail message receiving processing is started, and the process returns to the step S21. That is, in the new mail message receiving processing executed in the step S33, the LED 46 is lit up. Here, in the new mail message receiving processing, similar to the incoming call state processing, the motor not shown is rotated, and an incoming mail tone is output from the speaker not shown.

FIG. 14 is a flowchart showing a slide controlling processing. For example, when the power of the mobile terminal 10 is turned on, the CPU 20 determines whether or not a switch to a sliding position is made in a step S41. That is, it is determined whether or not neither the first magnetic sensor 40 nor the second magnetic sensor 44 outputs the maximum value. If "NO" in the step S41, that is, if any one of the first magnetic sensor 40 and the second magnetic sensor 44 outputs a maximum value, it is determined whether or not an end operation is performed in a step S43. For example, it is determined whether or not the on-hook key is pushed and held. If "NO" in the step S43, that is, if the end operation is not performed, the process returns to the step S41. On the other hand, if "YES" in the step S43, that is, if the end operation is performed, the slide controlling processing is ended.

Alternatively, if "YES" in the step S41, that is, if neither the first magnetic sensor 40 nor the second magnetic sensor 44 outputs the maximum value, it is determined whether or not during the incoming call in a step S45. That is, it is determined whether or not the incoming call flag 340 is turned on. If "YES" in the step S45, that is, if the incoming call flag 340 is turned on, during-incoming-call processing is executed in a step S47, and the process returns to the step S41. Here, a detailed description of the during-incoming-call processing is made later by using a flowchart shown in FIG. 15, and thus it is omitted here.

On the other hand, if "NO" in the step S45, that is, if the incoming call flag 340 is turned off, it is determined whether or not during an incoming mail in a step S49. That is, it is determined whether or not the incoming mail flag 342 is turned on. If "YES" in the step S49, that is, if the incoming mail flag 342 is turned on, the during-incoming-mail processing is executed in a step S51, and the process returns to the step S41. Here, a detailed description of the during-incoming-mail processing is made later by using a flowchart shown in FIG. 16, and thus it is omitted here.

Alternatively, if "NO" in the step S49, that is, if neither the incoming call flag 340 nor the incoming mail flag 342 is turned on, the during-standby processing is executed in a step S53, and the process returns to the step S41. Here, a detailed description of the during-standby processing is made by using flowcharts shown in FIG. 17 and FIG. 18, and thus, it is omitted here.

It should be noted that the CPU 20 executing the processing in the steps S1, S27, S45, S49 functions as a determiner. Furthermore, the CPU 20 executing the processing in the step S1, S45 functions as an incoming call determiner, and the CPU 20 executing the processing in the step S27, S49 functions as an incoming mail determiner.

FIG. 15 is the flowchart showing the during-incoming-call processing to be executed in the step S47 (see FIG. 14). The CPU 20 displays calling source information on the second display 34 in a step S71. As shown in FIG. 6(B), for example, on the basis of the calling source information sent from the communication partner, the phone number and the name of the communication partner are displayed on the second display 34.

Succeedingly, in a step S73, it is determined whether or not it is in the open position. That is, it is determined whether or not the value of the second magnetic sensor 44 is the maximum value. If "YES" in the step S73, that is, if it is in the open position, the process proceeds to a step S79. On the other hand, if "NO" in the step S73, that is, if it is not in the open position, it is determined whether or not it is in the closed position in a step S75. That is, it is determined whether or not the value of the first magnetic sensor 44 is the maximum value. If "NO" in the step S75, that is, if it is in the sliding position, the process returns to the step S73. On the other hand, if "YES" in the step S75, that is, if it is in the closed position, unattended answering processing is started in a step S77, and the process proceeds to a step S89. In the step S77, for example, an answering message is sent to the communication partner after the speech communication allowable state is established.

If the mobile terminal 10 is switched to the open position, speech communication processing is started in the step S79. That is, by execution of the speech communication processing, the speech communication allowable state is established. Succeedingly, in the processing in a step S81, the display of the second display 34 is switched. For example, as shown in FIG. 6(C), the display of the second display 34 is switched from the phone number and the name of the communication partner based on the calling source information to the image representing the touch keys such as the HF key Ta, the memo key Tb, the menu key Tc, etc.

Succeedingly, in a step S83, it is determined whether an input operation is made. For example, it is determined whether or not an arbitrary touch key displayed on the second display 34 is operated. Furthermore, determination of the presence or absence of a touch on the touch key is made depending on an ON state and an OFF state of the touch flag 344. In addition, specification of the operated touch key out of the plurality of touch keys is performed on the basis of the touched point and the release point stored in the touched position buffer 330.

If "NO" in the step S83, that is, if no input operation is made, the process proceeds to a step S87. On the other hand, if "YES" in the step S83, that is, if an input operation is made, an operation result is displayed on the first display 26 in a step S85. That is, the power of the first display 26 is turned on to display the result of the input operation. With reference to FIG. 6(D), for example, if the menu key Tc is operated, the menu screen is displayed on the first display 26.

Succeedingly, in the step S87, it is determined whether or not an on-hook operation is performed. That is, it is determined whether or not an operation of ending the speech communication state is performed. Here, the on-hook operation may be an operation of switching the mobile terminal 10 to the closed position, and an operation of pressing down the on-hook key. If "NO" in the step S87, that is, if the on-hook operation is not performed, the process returns to the step S83. On the other hand, if "YES" in the step S87, that is, if the on-hook operation is performed, the speech communication processing is ended in the step S89. That is, by controlling the transmitter/receiver circuit 14, a speech communication end signal is sent to the communication partner. Succeedingly, in a step S91, the display is erased, the during-incoming-call processing is ended, and the process returns to the slide controlling processing. That is, in the step S91, the power of the second display 34 is turned off to erase the display. In addition, if the power of the first display 26 is turned on, the power of the first display 26 is also turned off.

Here, if the incoming call state ceases during the sliding operation, a character string of "THERE IS NEW INCOMING CALL HISTORY" indicating no response to the incoming call is displayed on the second display 34.

FIG. 16 is a flowchart showing the during-incoming-mail processing to be executed in the step S51 (see FIG. 14). The CPU 20 displays header information on the second display 34 in a step S111. That is, the header information included in the new mail message data is displayed on the second display 34. For example, in the header information, the information indicating the sender of the mail message, and thus, the name of the send of the new mail message is displayed on the second display 34 as shown in FIG. 7(B). Here, in a case that receiving the new mail message has not been finished, and the header information of the new mail message cannot be obtained, the processing in the step S111 is not executed until the header information of the new mail message can be obtained.

In a step S113, it is determined whether or not it is in the open position. If "YES" in the step S113, that is, if it is in the open position, the process proceeds to a step S119. On the other hand, if "NO" in the step S113, that is, if it is not in the open position, it is determined whether or not it is in the closed position in a step S115. If "NO" in the step S115, that is, if it is in the sliding position, the process returns to the step S113. On the other hand, if "YES" in the step S115, that is, if it is not in the closed position, the unread mail flag 348 is turned on in a step S117, and the process proceeds to a step S129. That is, in the step S117, the text of the new mail message is not displayed, and thus, the unread mail flag 348 is turned on.

Furthermore, if a switch to the open position is made in a state that the name of the sender of the new incoming mail message is displayed on the second display 34, the text of the new mail message is displayed on the first display 26 in a step S119. For example, the text of the new mail message is displayed on the first display 26 as shown in FIG. 7(C). Succeedingly, in a step S121, the display of the second display 34 is switched. For example, as shown in FIG. 7(C), the display of the second display 34 is switched from the name of the sender of the new mail message to an image representing the reply key Td.

Succeedingly, in a step S123, it is determined whether or not an input operation is made. If "NO" in the step S123, that is, if an input operation is not performed, the process proceeds to a step S127. On the other hand, if "YES" in the step S123, that is, if an input operation is made, an operation result is displayed on the first display 26 in a step S125. For example, if the reply key Td is operated, a reply mail creation screen is displayed on the first display 26.

Succeedingly, in a step S127, it is determined whether or not it is in the closed position. If "NO" in the step S127, that is, if the open position is maintained, the process returns to the step S123. On the other hand, if "YES" in the step S127, that is, if the mobile terminal 10 is switched from the open position to the closed position, the new mail flag 346 is turned off in the step S129, and the display is erased in a step S131. That is, in the step S131, the power of the second display 34 is turned off, and the power of the first display 26 is also turned off if the power of the first display 26 is turned on. Then, after completion of the processing in the step S131, the during-incoming-mail processing is ended, and the process returns to the slide controlling processing.

Here, in a case that the incoming mail state ceases during the sliding operation, new mail message notifying information is displayed on the second display 34.

FIG. 17 is a flowchart showing the during-standby processing to be executed in the step S53 (see FIG. 14). The CPU 20 determines whether or not the new mail flag 346 is turned on in a step S151. That is, the mobile terminal 10 receives a new mail message and performs an operation of displaying the second display 34. If "NO" in the step S151, that is, if the new mail flag 346 is turned off, the process proceeds to a step S181 (see FIG. 18). On the other hand, if "YES" in the step S151, that is, if the new mail flag 346 is turned on, the new mail flag 346 is turned off in a step S153, and new mail message notifying information is displayed on the second display 34 in a step S155. For example, the character string of "THERE IS NEW MAIL MASSAGE" is displayed on the second display 34 as new mail message notifying information.

Succeedingly, in a step S157, it is determined whether or not it is in the open position. If "NO" in the step S157, that is, if it is not in the open position, the process proceeds to a step S163. On the other hand, if "YES" in the step S157, that is, if it is in the open position, a mail folder screen is displayed on the first display 26 in a step S159. That is, a GUI capable of arbitrarily selecting from all the received mail messages is displayed on the first display 26.

Succeedingly, in a step S161, it is determined whether or not a displaying operation of the new mail message is performed. For example, it is determined whether or not a new mail message is selected out of the plurality of displayed new mail messages by the operation key, and then, a decision key is operated. If "YES" in the step S161, that is, if the displaying operation of the new mail message is performed, the process proceeds to a step S169. On the other hand, if "NO" in the step S161, that is, if a displaying operation of the new mail message is not performed, it is determined whether or not it is in the closed position in a step S163. If "NO" in the step S161, that is, if a switch to the closed position is not made, the process returns to the step S157. On the other hand, if "YES" in the step S163, that is, if a switch to the closed position is made, the unread mail flag 348 is turned on in a step S165, and the display is erased in a step S167. That is, the powers of the first display 26 and the second display 34 are turned off. Then, after completion of the processing in the step S167, the during-standby processing is ended, and the process returns to the slide controlling processing.

Also, when the displaying operation of the new mail message is performed, the display of the second display 34 is switched in the step S169. That is, similar to the processing in the step S121, the display of the second display 34 is switched to the display of the touch keys. Then, in a step S171, the text of the new mail message is displayed on the first display 26. That is, similar to the processing in the step S125, the text of the new mail message is displayed on the first display 26.

Succeedingly, in a step S173, the unread mail flag 348 is turned off. That is, the text of the new mail message is displayed on the first display 26, and thus, the unread mail flag 348 is turned off. Then, in a step S175, it is determined whether or not an input operation is made. If "NO" in the step S175, the process proceeds to a step S179. On the other hand, if "YES" in the step S175, an operation result is displayed on the first display 26 in a step S177. Succeedingly, in the step S179, it is determined whether or not it is in the closed position. If "NO" in the step S179, that is, if the open position is held, the process returns to the step S175. On the other hand, if "YES" in the step S179, that is, if the mobile terminal 10 is switched to the closed position, the process proceeds to the step S169.

Here, with reference to FIG. 18, if the new mail flag 346 is turned off in the during-standby processing, it is determined whether or not the unread mail flag 348 is turned on in a step S181. That is, it is determined whether or not the text of the new mail message has never been displayed. If "NO" in the step S181, that is, if the unread mail flag 348 is turned off, mobile terminal information is displayed on the second display 34 in a step S183. For example, as shown in FIG. 8(B), a radio wave receiving state by the antenna 12, a remaining capacity of the rechargeable battery, a current date and time, etc. are displayed on the second display 34. Succeedingly, in a step S185, it is determined whether or not a switch to the closed position is made. If "NO" in the step S185, that is, if a switch to the closed position is not made, the processing in the step S185 is repetitively executed. On the other hand, if "YES" in the step S185, that is, if a switch to the closed position is made, the process proceeds to the step S167. Here, if a switch to the open position is made, an image representing a standby state is displayed on the first display 26.

Furthermore, in the during-standby processing, if the unread mail flag 348 is turned on, the unread mail notifying information is displayed on the second display 34 in a step S187. For example, as shown in FIG. 8(C), a character string "THERE IS UNREAD MAIL" is displayed on the second display 34. Succeedingly, in a step S189, it is determined whether or not a touch operation is made. That is, it is determined whether or not the touch flag 344 is turned on in a state that the unread mail notifying information is displayed.

If "NO" in the step S189, that is, if the touch flag 344 is turned off, it is determined whether or not a switch to the closed position is made in a step S191. If "NO" in the step S191, the process returns to the step S189. On the other hand, if "YES" in the step S191, the process proceeds to the step S167. Alternatively, if "YES" in the step S189, that is, if the touch flag 344 is turned on, a mail folder screen is displayed on the first display 26 in a step S193. That is, similar to the step S159, the GUI is displayed on the first display 26.

Succeedingly, in a step S195, it is determined whether or not a displaying operation of a new mail message is made. If "YES" in the step S195, that is, if a displaying operation of a new mail message is performed, the process proceeds to the step S169. On the other hand, if "NO" in the step S195, that is, if a displaying operation of a new mail message is not performed, it is determined whether or not it is in the closed position in a step S197. If "NO" in the step S197, that is, if it is not in the closed position, the process returns to the step S195. On the other hand, if "YES" in the step S197, that is, if a switch to the closed position is performed without displaying a new mail message, the process proceeds to the step S167.

Here, the CPU 20 executing the processing in the steps S71, S111, S155, S183 functions as an information displayer. Furthermore, the CPU 20 executing the processing in the steps S79, S119, S159 functions as a first processor. In addition, the CPU 20 executing the processing in the step S79 functions as a speech communication processor, and the CPU 20 executing the processing in the step S119 functions as a mail displayer.

FIG. 19 is a flowchart showing a touch key controlling processing. For example, when the user performs an arbitrary function, the CPU 20 acquires data to be stored in the execution function buffer 332 in a step S211. That is, a function ID of the function to be executed is read from the execution function buffer 332. Here, the CPU 20 executing the processing in the step S211 functions as an acquirer.

Succeedingly, in a step S213, it is determined whether or not it is necessary to display the touch keys. That is, in the processing in the step S213, the function ID read in the step S211 is retrieved through the touch key table data 336 and determination is made on the basis of the data indicating a necessity of displaying the touch keys. If "NO" in the step S213, that is, if it is not necessary to display the touch keys, the touch key controlling processing is ended. On the other hand, if "YES" in the step S213, that is, if it is necessary to display the touch keys, the touch keys corresponding to the function ID are displayed on the second display 34 in a step S215. For example, in a case of the music player function, an image (design) representing the first music selection key Tf, the second music selection key Tg, the first volume key Th and the second volume key Tj is displayed on the second display 34 on the basis of the touch key table data 336 as shown in FIG. 9. Here, the CPU 20 executing the processing in the step S215 functions as a design displayer.

Successively, in a step S217, it is determined whether or not a touch operation is made. That is, it is determined whether or not the touch flag 344 is turned on. If "NO" in the step S217, that is, if the touch flag 344 is turned off, it is determined whether or not an end operation is performed in a step S219. That is, it is determined whether or not an operation of ending the executing function is performed. If "NO" in the step S219, that is, if the end operation is not performed, the process returns to the step S217. On the other hand, if "YES" in the step S219, that is, if the end operation is performed, the touch key controlling processing is ended.

Alternatively, if "YES" in the step S217, that is, if the touch flag 344 is turned on, an arbitrary processing is executed depending on the operated touch key in a step S221. For example, if the first volume key Th is operated when the music player function is executed, processing of decreasing the volume of the reproducing music is executed. Here, the CPU 20 executing the processing in the step S221 functions as a second processor.

As understood from the above description, the mobile terminal 10 includes the first case C1 and the second case C2. Furthermore, the mobile terminal 10 is a slidably mobile terminal in which the first case C1 is slidably coupled with the second case C2 with the first case C1 stacked thereon. On the top surface of the first case C, the first display 26 is provided. Furthermore, on the top surface of the second case C2, the second display 34 is provided in such a position so as not to be exposed in the home position (closed position), and to be exposed when a sliding operation is performed.

Thus, the user can confirm the predetermined information such as a time on the second display 34 by performing a sliding operation. Then, the second display 34 being lower in power consumption than that of the first display 26 is adopted, and thus, it is possible to reduce the power consumption of the mobile terminal 10.

Furthermore, in the home position, the first display 26 is in a display state that takes the privacy into consideration. That is, the predetermined information can be confirmed only when a sliding operation is performed, and thus, the privacy of the user is protected. Here, the display state that takes the privacy into consideration may be a state that no image is displayed on the first display 26, and a state that a backlight of the first display 26 is lit out. In addition, a state that only the information designated by the user is displayed on the first display 26 may be possible.

Furthermore, the first display 26 and the second display 34 are provided in such positions so as to be simultaneously confirmed when a sliding operation is performed, capable of improving user convenience.

Here, in this embodiment, for the first display 26, the LCD monitor is utilized, and for the second display 34, an organic light emitting panel is utilize, but other display devices may be used. Also, on the top surface of the first display 34 as well, the touch panel 38 may be provided. In addition, for the LED 46, a color LED capable of emitting light in a plurality of colors is employed, and the color of the emitted light may be changed between during the incoming call and the incoming mail.

Furthermore, in the mobile terminal 10 of this embodiment, the sridable mobile terminal is made up of two cases such as the first case C1 and the second case C2, but a slidable mobile terminal making up of three or more cases may be possible. For example, as to the slidable mobile terminal making up of the three cases, with respect to the uppermost case, the intermediate case slides in a right and left directions, and the lowermost case slides in up and down directions. Then, in this case, the first display 26 is provided on the uppermost case, and the second display 34 is provided in such a position so as to be exposed when either the intermediate case or the lowermost case slides.

Also, in this embodiment, the open position, the closed position and the sliding position are detected by the first magnetic sensor 40, the second magnetic sensor 44 and the magnet 42, but the open position, the closed position and the sliding position may be detected by using two or more mechanical switches, or the open position, the closed position and the sliding position may be detected by a combination among the mechanical switch, the magnetic sensor and the magnet.

Furthermore, in another embodiment, even if the power saving mode by the power saving function is not set, the respective processing shown in FIG. 14 to FIG. 18 may be executed.

Moreover, for the communication system of the mobile terminal 10, a W-CDMA system, a TDMA system, a PHS system and a GSM system, etc. may be adopted without being restricted to the CDMA system. A PDA (Personal Digital Assistant) having a sliding mechanism and a handheld terminal, such as a notebook PC, etc. may be possible, and a portable game apparatus having a sliding mechanism may be possible, without being restricted to only the mobile terminal 10.

Although the present invention has been described and illustrated in detail, it is clearly understood that the same is by way of illustration and example only and is not to be taken by way of limitation, the spirit and scope of the present invention being limited only by the terms of the appended claims.

EXPLANATION OF REFERENCE CHARACTERS

10 . . . mobile terminal
20 . . . CPU
22 . . . key input device
26 . . . first display
34 . . . second display
38 . . . touch panel
40 . . . first magnetic sensor
42 . . . magnet
44 . . . second magnetic sensor
46 . . . LED
50 . . . sliding mechanism
52 . . . first plate
54 . . . second plate
56 . . . spring
C1 . . . first case
C2 . . . second case

What is claimed is:

1. A mobile terminal, comprising:
a first housing comprising a first display;
at least one second housing comprising a second display and a keypad, wherein said second housing is slidably coupled with said first housing such that said first housing and said second housing can be switched between a closed state, a sliding state, and an open state,
wherein, in the closed state, the second display and the keypad are not exposed,
wherein, in the sliding state, the second display is exposed but the keypad is not exposed, and
wherein, in the open state, the second display and the keypad are both exposed; and
one or more programs that, when an incoming communication is received while said first housing and said second housing are in the closed state,
when said first housing and said second housing are switched to the sliding state, display information related to the incoming communication on the second display, and,
subsequently,
if said first housing and said second housing are switched from the sliding state to the open state, execute predetermined processing for the incoming communication, and,
if said first housing and said second housing are switched from the sliding state to the closed state, do not execute the predetermined processing for the incoming communication.

2. A mobile terminal according to claim 1, wherein said first housing is coupled with said second housing so as to be stacked thereon.

3. A mobile terminal according to claim 1, further comprising:
a determiner which determines whether said first housing and said second housing are in the closed state, the sliding state, or the open state; and
a detector which detects a sliding operation.

4. A mobile terminal according to claim 3, further comprising:
an open position detector which detects whether or not said first housing and said second housing are in the open state; and
a processor which executes the one or more programs.

5. A mobile terminal according to claim 3, wherein the one or more programs comprise the determiner and the detector.

6. A mobile terminal according to claim 1, wherein the incoming communication includes an incoming call, and wherein the predetermined processing comprises initiating speech communication.

7. A mobile terminal according to claim 1, wherein said incoming communication includes an incoming mail message, and wherein the predetermined processing comprises displaying a content of said mail message on said first display.

8. A mobile terminal according to claim 1, further comprising:
a touch operation detector which detects, in a touch responsive area provided on said second display, a touch operation within said touch responsive area;
an acquirer which acquires information of processing to be executed;
a design displayer which displays a design on said second display on the basis of the information of the processing acquired by said acquirer; and
a processor which executes predetermined processing when a touch operation is included within said display area of the design.

9. A mobile terminal according to claim 1, wherein the incoming communication is an call from a caller, and wherein the information related to the incoming communication comprises an identification of the caller.

10. A mobile terminal according to claim 1, wherein the incoming communication is an email message from a sender, and wherein the information related to the incoming communication comprises an identification of the sender.

11. A mobile terminal according to claim 1, wherein the second display comprises a touch panel, and wherein executing predetermined processing for the incoming communication comprises displaying one or more virtual keys related to the incoming communication in the second display.

12. A mobile terminal according to claim 11, wherein the incoming communication is a call, and wherein the one or more virtual keys comprise one or more of a hands-free key, a memo key, and a menu key.

13. A mobile terminal according to claim 11, wherein the incoming communication is an email message, and wherein the one or more virtual keys comprise a reply key for displaying a screen, for creating a reply to the email message, on the first display.

14. A mobile terminal according to claim 1, wherein the incoming communication is a call from a caller, and wherein the one or more programs, if said first housing and said second housing are switched from the sliding state to the closed state while the call is received, execute unattended answering processing.

15. A mobile terminal according to claim 14, wherein the unattended answering processing comprises providing an unattended answering message to the caller.

16. A mobile terminal according to claim 14, wherein executing the unattended answering processing comprises:
- waiting a predetermined time; and,
  - if the call is not answered during the predetermined time, providing an unattended answering message to the caller.

17. A mobile terminal according to claim 1, wherein the second display comprises a touch panel, and wherein the one or more programs, when an application is executed while said first housing and said second housing are in the open state, display one or more virtual keys related to the executed application on the second display.

18. A mobile terminal according to claim 1, wherein the one or more programs, while in a standby state, if said first housing and said second housing are switched from the closed state to the sliding state, display mobile terminal information on the second display, wherein the mobile terminal information comprises one or more of a radio-wave receiving state of an antenna of the mobile terminal, a remaining capacity of a rechargeable battery of the mobile terminal, and a current date and time.

19. A mobile terminal according to claim 1, wherein the one or more programs, while in a standby state, when said first housing and said second housing are switched from said closed state to said sliding state:
- determine whether unread messages have been received;
  - if it is determined that unread messages have been received, display a notification of the unread messages on the second display; and,
  - if it is determined that unread messages have not been received, display mobile terminal information on the second display, wherein the mobile terminal information comprises one or more of a radio-wave receiving state of an antenna of the mobile terminal, a remaining capacity of a rechargeable battery of the mobile terminal, and a current date and time.

20. A mobile terminal according to claim 19, wherein the second display comprises a touch panel, and wherein the notification of the unread messages comprises a virtual key for displaying one or more unread messages on the first display.

* * * * *